(12) United States Patent
Wang et al.

(10) Patent No.: US 12,535,918 B2
(45) Date of Patent: Jan. 27, 2026

(54) TOUCH CONTROL STRUCTURE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Lingran Wang, Beijing (CN); Shilong Wang, Beijing (CN); Yao Hu, Beijing (CN); Jun Yan, Beijing (CN); Gukhwan Song, Beijing (CN); Jianbo Li, Beijing (CN); Wenhui Gao, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 26 days.

(21) Appl. No.: 17/428,974

(22) PCT Filed: Oct. 27, 2020

(86) PCT No.: PCT/CN2020/123808
§ 371 (c)(1),
(2) Date: Aug. 5, 2021

(87) PCT Pub. No.: WO2022/087802
PCT Pub. Date: May 5, 2022

(65) Prior Publication Data
US 2023/0205377 A1 Jun. 29, 2023

Related U.S. Application Data

(63) Continuation-in-part of application No. 16/931,713, filed on Jul. 17, 2020, now Pat. No. 11,592,918,
(Continued)

(51) Int. Cl.
*G06F 3/044* (2006.01)

(52) U.S. Cl.
CPC .......... *G06F 3/0446* (2019.05); *G06F 3/0443* (2019.05); *G06F 2203/04102* (2013.01); *G06F 2203/04111* (2013.01)

(58) Field of Classification Search
None
See application file for complete search history.

(56) References Cited

U.S. PATENT DOCUMENTS 9,733,751 B2 * 8/2017 Lo ........................ G06F 1/1652
2012/0299865 A1 * 11/2012 Yu ........................ G06F 3/0446
345/174

(Continued)

FOREIGN PATENT DOCUMENTS

CN 205750746 U 11/2016
CN 206322135 U 7/2017
(Continued)

OTHER PUBLICATIONS

International Search Report & Written Opinion mailed Jul. 27, 2021, regarding PCT/CN2020/123808.
(Continued)

*Primary Examiner* — Duane N Taylor, Jr.
(74) *Attorney, Agent, or Firm* — Intellectual Valley Law, P.C.

(57) ABSTRACT

A touch control structure is provided. The touch control structure includes a plurality of first mesh electrodes arranged in a plurality of rows and a plurality of second mesh electrodes arranged in a plurality of columns. The touch control structure includes a plurality of bendable mesh blocks along a column direction, and a plurality of gaps respectively in the plurality of bendable mesh blocks. In a respective bendable mesh block of the plurality of bendable (Continued)

mesh blocks, a respective gap of the plurality of gaps includes a plurality of line opens respectively breaking open multiple mesh lines of the respective bendable mesh block. The respective gap spaces apart the respective bendable mesh block into a respective first half mesh block and a respective second half mesh block directly adjacent to each other, which are insulated from each other by the respective gap.

20 Claims, 31 Drawing Sheets

Related U.S. Application Data which is a continuation-in-part of application No. 15/745,054, filed as application No. PCT/CN2017/096013 on Aug. 4, 2017, now Pat. No. 10,739,885.

(56) References Cited

U.S. PATENT DOCUMENTS

| | | |
|---|---|---|
| 2016/0188098 A1 | 6/2016 | Her et al. |
| 2016/0282993 A1 | 9/2016 | Song |
| 2017/0315641 A1 | 11/2017 | Cai |
| 2018/0157361 A1 | 6/2018 | Kim |
| 2019/0235681 A1 | 8/2019 | Li et al. |
| 2019/0377443 A1 | 12/2019 | Dong et al. |
| 2020/0183538 A1 | 6/2020 | Li et al. |
| 2020/0333918 A1 | 10/2020 | Lin et al. |

FOREIGN PATENT DOCUMENTS

| | | | |
|---|---|---|---|
| CN | 107132955 A * | 9/2017 | ........... G06F 3/0412 |
| CN | 107450772 A | 12/2017 | |
| CN | 108153376 A | 6/2018 | |
| CN | 108334215 A | 7/2018 | |
| CN | 108919996 A | 11/2018 | |
| CN | 109508118 A | 3/2019 | |
| CN | 110221653 A | 9/2019 | |

OTHER PUBLICATIONS

First Office Action in the Chinese Patent Application No. 202011162832.5, dated Nov. 14, 2024; English translation attached.

* cited by examiner

TOUCH CONTROL STRUCTURE AND DISPLAY APPARATUS

CROSS-REFERENCE TO RELATED APPLICATION

This application is a national stage application under 35 U.S.C. § 371 of International Application No. PCT/CN2020/123808, filed Oct. 27, 2020, which is a continuation-in-part of U.S. application Ser. No. 16/931,713 filed Jul. 17, 2020, which is a continuation-in-part of U.S. application Ser. No. 15/745,054 filed Aug. 4, 2017, which is a national stage application under 35 U.S.C. § 371 of International Application No. PCT/CN2017/096013 filed Aug. 4, 2017, which claims priority to Chinese Patent Application No. 201710051816.0, filed Jan. 20, 2017. Each of the forgoing applications is herein incorporated by reference in its entirety for all purposes.

TECHNICAL FIELD

The present invention relates to display technology, more particularly, to a touch control structure and a display apparatus.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides touch control structure, comprising a plurality of first mesh electrodes arranged in a plurality of rows and a plurality of second mesh electrodes arranged in a plurality of columns; wherein the touch control structure comprises a plurality of bendable mesh blocks along a column direction, and a plurality of gaps respectively in the plurality of bendable mesh blocks; in a respective bendable mesh block of the plurality of bendable mesh blocks, a respective gap of the plurality of gaps comprises a plurality of line opens respectively breaking open multiple mesh lines of the respective bendable mesh block; the respective gap spaces apart the respective bendable mesh block into a respective first half mesh block and a respective second half mesh block directly adjacent to each other, the first half mesh block and a respective second half mesh block insulated from each other by the respective gap; at least two adjacent line opens of the plurality of line opens in the respective gap are arranged in a direction non-parallel to the column direction; and the touch control structure is bendable along the plurality of gaps.

Optionally, a respective row of the plurality of rows comprises a plurality of first mesh blocks arranged along a row direction; the plurality of first mesh blocks in the respective row comprise the respective first half mesh block and the respective second half mesh block of the respective bendable mesh block, multiple first adjacent mesh blocks, and multiple second adjacent mesh blocks in a same row; and the multiple first adjacent mesh blocks are on a side of the respective bendable mesh block away from the multiple second adjacent mesh blocks.

Optionally, a combination of the respective first half mesh block, the respective gap, and the respective second half mesh block, has a shape substantially same as a shape of an immediate adjacent first adjacent mesh block of the multiple first adjacent mesh blocks, the immediate adjacent first adjacent mesh block being most adjacent to the respective first half mesh block among the multiple first adjacent mesh blocks.

Optionally, the combination of the respective first half mesh block, the respective gap, and the respective second half mesh block, has a shape substantially same as a shape of an immediate adjacent second adjacent mesh block of the multiple second adjacent mesh blocks, the immediate adjacent second adjacent mesh block being most adjacent to the respective second half mesh block among the multiple second adjacent mesh blocks.

Optionally, the plurality of first mesh electrodes comprise a plurality of first sub-electrodes and a plurality of second sub-electrodes; a respective one of the plurality of first mesh electrodes comprises a respective one of the plurality of first sub-electrodes and a respective one of the plurality of second sub-electrodes; a respective column of the plurality of columns comprises a plurality of second mesh blocks electrically connected together and arranged along a column direction; a respective row of the plurality of rows comprises a plurality of first mesh blocks arranged along a row direction; the plurality of first mesh blocks in the respective row comprise the respective first half mesh block and the respective second half mesh block of the respective bendable mesh block, multiple first adjacent mesh blocks, and multiple second adjacent mesh blocks in a same row; the multiple first adjacent mesh blocks and the respective first half mesh block are electrically connected to each other, forming the respective one of the plurality of first sub-electrodes; and the multiple second adjacent mesh blocks and the respective second half mesh block are electrically connected, forming the respective one of the plurality of second sub-electrodes that is spaced apart from the respective one of the plurality of first sub-electrodes by the respective gap.

Optionally, the touch control structure further comprises a plurality of first touch signal lines respectively connected to the plurality of first sub-electrodes; a plurality of second touch signal lines respectively connected to the plurality of second sub-electrodes; and a plurality of third touch signal lines respectively connected to the plurality of second mesh electrodes; wherein, in a same respective row, a respective one of the plurality of first touch signal lines is electrically connected to the multiple first adjacent mesh blocks and the respective first half mesh block in the respective one of the plurality of first sub-electrodes, and a respective one of the plurality of second touch signal lines is electrically connected to the multiple second adjacent mesh blocks and the respective second half mesh block in the respective one of the plurality of second sub-electrodes.

Optionally, the plurality of first touch signal lines and the plurality of second touch signal lines are touch sensing signal lines; the plurality of first touch signal lines and the plurality of second touch signal lines are two independent sets of touch signals lines that are independently controlled; and the plurality of third touch signal lines are touch scanning signal lines configured to provide touch scanning signals respectively to the plurality of second mesh blocks respectively in the plurality of columns.

Optionally, the plurality of bendable mesh blocks are spaced apart from each other along the column direction.

Optionally, first mesh blocks of the plurality of rows of the plurality of first mesh electrodes and second mesh blocks of the plurality of columns of the plurality of second mesh electrodes are respectively arranged in interlaced matrices, forming a plurality of bridge intersections and a plurality of non-bridge intersections; in a respective one of the plurality of non-bridge intersections, adjacent mesh blocks are spaced apart and insulated from each other; adjacent bendable mesh blocks of the plurality of bendable mesh blocks are spaced apart from each other along the column direction by the respective one of the plurality of non-bridge intersections; and the plurality of gaps and multiple non-bridge intersections respectively spacing apart the plurality of bendable mesh blocks along the column direction together form the bendable line along which the touch control structure is bendable.

Optionally, a contour line of the respective gap is an undulating contour line.

Optionally, the undulating contour line comprises alternating half waves and base lines.

Optionally, at least two of the half waves have different wave forms.

Optionally, the different wave forms comprise a triangular half wave form and a trapezoidal half wave form; and the base lines are aligned along a direction substantially parallel to the column direction.

Optionally, the respective bendable mesh block comprises a plurality of fill patterns; the respective gap of the plurality of gaps spaces apart a first fill pattern in the plurality of fill patterns into a first half fill pattern and a second half fill pattern, spaces apart a second fill pattern in the plurality of fill patterns into a third half fill pattern and a fourth half fill pattern; the respective first half mesh block further comprises a third fill pattern; the respective second half mesh block further comprises a fourth fill pattern; the respective gap of the plurality of gaps spaces apart the third fill pattern from the fourth fill pattern; and the respective gap of the plurality of gaps further spaces apart a cross mesh structure of the respective bendable mesh block into a first half cross mesh structure and a second half cross mesh structure.

Optionally, the respective bendable mesh block comprises a plurality of fill patterns; the respective gap of the plurality of gaps spaces apart a first fill pattern in the plurality of fill patterns into a first half fill pattern and a second half fill pattern, spaces apart a second fill pattern in the plurality of fill patterns into a third half fill pattern and a fourth half fill pattern; the respective first half mesh block further comprises a third fill pattern; the respective second half mesh block further comprises a fourth fill pattern; the respective gap of the plurality of gaps spaces apart the third fill pattern from the fourth fill pattern; the respective gap of the plurality of gaps further spaces apart a cross mesh structure of the respective bendable mesh block into a first half cross mesh structure and a second half cross mesh structure; the first half cross mesh structure is part of a conductive path in the respective one of the plurality of first sub-electrodes; and the second half cross mesh structure is part of a conductive path in the respective one of the plurality of second sub-electrodes.

In another aspect, the present disclosure provides a display apparatus, comprising a display panel, a touch control structure on the display panel, and a plurality of touch control integrated circuits connect to the touch control structure; wherein the touch control structure comprises a plurality of first mesh electrodes arranged in a plurality of rows and a plurality of second mesh electrodes arranged in a plurality of columns; wherein the touch control structure comprises a plurality of bendable mesh blocks along a column direction, and a plurality of gaps respectively in the plurality of bendable mesh blocks; in a respective bendable mesh block of the plurality of bendable mesh blocks, a respective gap of the plurality of gaps comprises a plurality of line opens respectively breaking open multiple mesh lines of the respective bendable mesh block; the respective gap spaces apart the respective bendable mesh block into a respective first half mesh block and a respective second half mesh block directly adjacent to each other, the first half mesh block and a respective second half mesh block insulated from each other by the respective gap; at least two adjacent line opens of the plurality of line opens in the respective gap are arranged in a direction non-parallel to the column direction; and the touch control structure is bendable along the plurality of gaps.

Optionally, a respective row of the plurality of rows comprises a plurality of first mesh blocks arranged along a row direction; the plurality of first mesh blocks in the respective row comprise the respective first half mesh block and the respective second half mesh block of the respective bendable mesh block, multiple first adjacent mesh blocks, and multiple second adjacent mesh blocks in a same row; and the multiple first adjacent mesh blocks are on a side of the respective second half mesh block away from the multiple second adjacent mesh blocks.

Optionally, a combination of the respective first half mesh block, the respective gap, and the respective second half mesh block, has a shape substantially same as a shape of an immediate adjacent first adjacent mesh block of the multiple first adjacent mesh blocks, the immediate adjacent first adjacent mesh block being most adjacent to the respective first half mesh block among the multiple first adjacent mesh blocks.

Optionally, the combination of the respective first half mesh block, the respective gap, and the respective second half mesh block, has a shape substantially same as a shape of an immediate adjacent second adjacent mesh block of the multiple second adjacent mesh blocks, the immediate adjacent second adjacent mesh block being most adjacent to the respective second half mesh block among the multiple second adjacent mesh blocks.

Optionally, the plurality of first mesh electrodes comprise a plurality of first sub-electrodes and a plurality of second sub-electrodes; a respective one of the plurality of first mesh electrodes comprises a respective one of the plurality of first sub-electrodes and a respective one of the plurality of second sub-electrodes; a respective column of the plurality of columns comprises a plurality of second mesh blocks electrically connected together and arranged along a column direction; a respective row of the plurality of rows comprises a plurality of first mesh blocks arranged along a row direction; the plurality of first mesh blocks in the respective row comprise the respective first half mesh block and the respective second half mesh block of the respective bendable mesh block, multiple first adjacent mesh blocks, and multiple second adjacent mesh blocks in a same row; the multiple first adjacent mesh blocks and the respective first half mesh block are electrically connected to each other, forming the respective one of the plurality of first sub-electrodes; and the multiple second adjacent mesh blocks and the respective second half mesh block are electrically connected, forming the respective one of the plurality of second sub-electrodes that is spaced apart from the respective one of the plurality of first sub-electrodes by the respective gap.

Optionally, the display apparatus further comprises a plurality of first touch signal lines respectively connected to the plurality of first sub-electrodes; a plurality of second touch signal lines respectively connected to the plurality of second sub-electrodes; and a plurality of third touch signal lines respectively connected to the plurality of second mesh electrodes; wherein, in a same respective row, a respective one of the plurality of first touch signal lines is electrically connected to the multiple first adjacent mesh blocks and the respective first half mesh block in the respective one of the plurality of first sub-electrodes, and a respective one of the plurality of second touch signal lines is electrically connected to the multiple second adjacent mesh blocks and the respective second half mesh block in the respective one of the plurality of second sub-electrodes; wherein the plurality of touch control integrated circuits comprises a first touch control integrated circuit configured to control the plurality of first touch signal lines and a second touch control integrated circuit configured to control the plurality of second touch signal lines.

Optionally, the plurality of first touch signal lines and the plurality of second touch signal lines are touch sensing signal lines; the plurality of first touch signal lines and the plurality of second touch signal lines are two independent sets of touch signals lines that are independently controlled; and the plurality of third touch signal lines are touch scanning signal lines configured to provide touch scanning signals respectively to the plurality of second mesh blocks respectively in the plurality of columns.

Optionally, the plurality of bendable mesh blocks are spaced apart from each other along the column direction.

Optionally, first mesh blocks of the plurality of rows of the plurality of first mesh electrodes and second mesh blocks of the plurality of columns of the plurality of second mesh electrodes are respectively arranged in interlaced matrices, forming a plurality of bridge intersections and a plurality of non-bridge intersections; in a respective one of the plurality of non-bridge intersections, adjacent mesh blocks are spaced apart and insulated from each other; adjacent bendable mesh blocks of the plurality of bendable mesh blocks are spaced apart from each other along the column direction by the respective one of the plurality of non-bridge intersections; and the plurality of gaps and multiple non-bridge intersections respectively spacing apart the plurality of bendable mesh blocks along the column direction together form the bendable line along which the display apparatus is bendable.

Optionally, a contour line of the respective gap is an undulating contour line.

Optionally, the undulating contour line comprises alternating half waves and base lines.

Optionally, at least two of the half waves have different wave forms.

Optionally, the different wave forms comprise a triangular half wave form and a trapezoidal half wave form; and the base lines are aligned along a direction substantially parallel to the column direction.

Optionally, the respective bendable mesh block comprises a plurality of fill patterns; the respective gap of the plurality of gaps spaces apart a first fill pattern in the plurality of fill patterns into a first half fill pattern and a second half fill pattern, spaces apart a second fill pattern in the plurality of fill patterns into a third half fill pattern and a fourth half fill pattern; the respective first half mesh block further comprises a third fill pattern; the respective second half mesh block further comprises a fourth fill pattern; the respective gap of the plurality of gaps spaces apart the third fill pattern from the fourth fill pattern; and the respective gap of the plurality of gaps further spaces apart a cross mesh structure of the respective bendable mesh block into a first half cross mesh structure and a second half cross mesh structure.

Optionally, the respective bendable mesh block comprises a plurality of fill patterns; the respective gap of the plurality of gaps spaces apart a first fill pattern in the plurality of fill patterns into a first half fill pattern and a second half fill pattern, spaces apart a second fill pattern in the plurality of fill patterns into a third half fill pattern and a fourth half fill pattern; the respective first half mesh block further comprises a third fill pattern; the respective second half mesh block further comprises a fourth fill pattern; the respective gap of the plurality of gaps spaces apart the third fill pattern from the fourth fill pattern; the respective gap of the plurality of gaps further spaces apart a cross mesh structure of the respective bendable mesh block into a first half cross mesh structure and a second half cross mesh structure; the first half cross mesh structure is part of a conductive path in the respective one of the plurality of first sub-electrodes; and the second half cross mesh structure is part of a conductive path in the respective one of the plurality of second sub-electrodes.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch control structure and a display apparatus that substantially obviate one or more of the problems due to limitations and disadvantages of the related art. In one aspect, the present disclosure provides a touch control structure. In some embodiments, the touch control structure includes a plurality of first mesh electrodes arranged in a plurality of rows and a plurality of second mesh electrodes arranged in a plurality of columns. In some embodiments, the touch control structure includes a plurality of gaps respectively in a plurality of bendable mesh blocks along a column direction. Optionally, a respective gap of the plurality of gaps spaces apart a respective bendable mesh block of the plurality of bendable mesh blocks into a respective first half mesh block and a respective second half mesh block directly adjacent to each other. Optionally, the plurality of gaps are aligned along a direction substantially parallel to the column direction, the touch control structure being bendable along the plurality of gaps.

Figure 1:
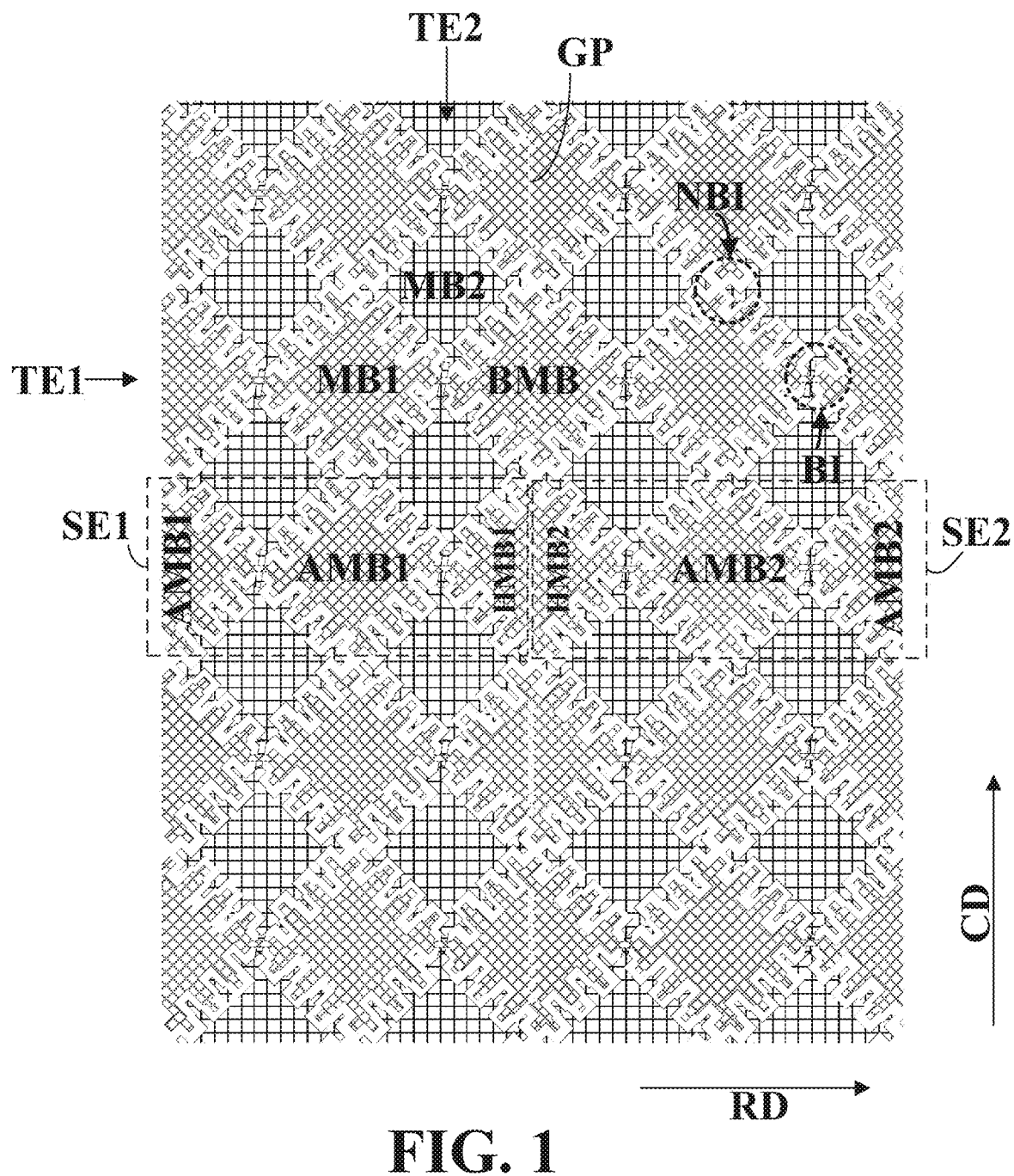
FIG. 1 is a schematic diagram illustrating the structure of a touch control structure in some embodiments according to the present disclosure.

FIG. 1 is a schematic diagram illustrating the structure of a touch control structure in some embodiments according to the present disclosure. Referring to FIG. 1, the touch control structure in some embodiments includes a plurality of first mesh electrodes TE1 arranged in a plurality of rows and a plurality of second mesh electrodes TE2 arranged in a plurality of columns. Adjacent rows of the plurality of rows are isolated from each other. Adjacent columns of the plurality of columns are isolated from each other. Optionally, the touch control structure is a mutual capacitance type touch control structure. Optionally, the plurality of first mesh electrodes TE1 are a plurality of touch sensing electrodes, and the plurality of second mesh electrodes TE2 are a plurality of touch scanning electrodes. Optionally, the plurality of first mesh electrodes TE1 are a plurality of touch scanning electrodes, and the plurality of second mesh electrodes TE2 are a plurality of touch sensing electrodes.

In some embodiments, the plurality of first mesh electrodes TE1 include a plurality of first sub-electrodes SE1 and a plurality of second sub-electrodes SE2. A respective one of the plurality of first mesh electrodes includes a respective one of the plurality of first sub-electrodes SE1 and a respective one of the plurality of second sub-electrodes SE2. A respective column of the plurality of columns includes a plurality of second mesh blocks MB2 electrically connected together and arranged along a column direction CD. A respective row of the plurality of rows includes a plurality of first mesh blocks MB1 arranged along a row direction RD. The column direction CD and the row direction RD cross over each other. Optionally, the column direction CD and the row direction RD are perpendicular to each other. Optionally, the column direction CD and the row direction RD cross over each other at an inclined angle that is not 90 degrees.

In some embodiments, the plurality of first mesh blocks MB1 in the respective row include a respective bendable mesh block BMB. In some embodiments, the respective bendable mesh block BMB includes a respective first half mesh block HMB1 and a respective second half mesh block HMB2 directly adjacent to each other and spaced apart by a respective gap GP. Optionally, the plurality of first mesh blocks MB1 in the respective row further includes multiple first adjacent mesh blocks AMB1 and multiple second adjacent mesh blocks AMB2 in a same row. Optionally, the multiple first adjacent mesh blocks AMB1 and the respective first half mesh block HMB1 are electrically connected to each other, forming the respective one of the plurality of first sub-electrodes SE1. Optionally, the multiple second adjacent mesh blocks AMB2 and the respective second half mesh block HMB2 are electrically connected, forming the respective one of the plurality of second sub-electrodes SE2 that is spaced apart from the respective one of the plurality of first sub-electrodes SE1 by the respective gap GP.

Optionally, a combination of the respective first half mesh block HMB1, the respective gap GP, and the respective second half mesh block HMB2, has a shape substantially same as a shape of an immediate adjacent first adjacent mesh block of the multiple first adjacent mesh blocks AMB1, the immediate adjacent first adjacent mesh block directly connected to the respective first half mesh block HMB1. Optionally, the combination of the respective first half mesh block HMB1, the respective gap GP, and the respective second half mesh block HMB2, has a shape substantially same as a shape of an immediate adjacent second adjacent mesh block of the multiple second adjacent mesh blocks AMB2, the immediate adjacent second adjacent mesh block directly connected to the respective second half mesh block HMB2. As used herein, the term "substantially same shape" refers to two portions deviate in shape or geometry from each other by less than 20%, e.g., less than 15%, less than 10%, less than 5%, less than 1%, or less than 0.5%. Optionally, substantially same shape means completely same shape.

Figure 2:
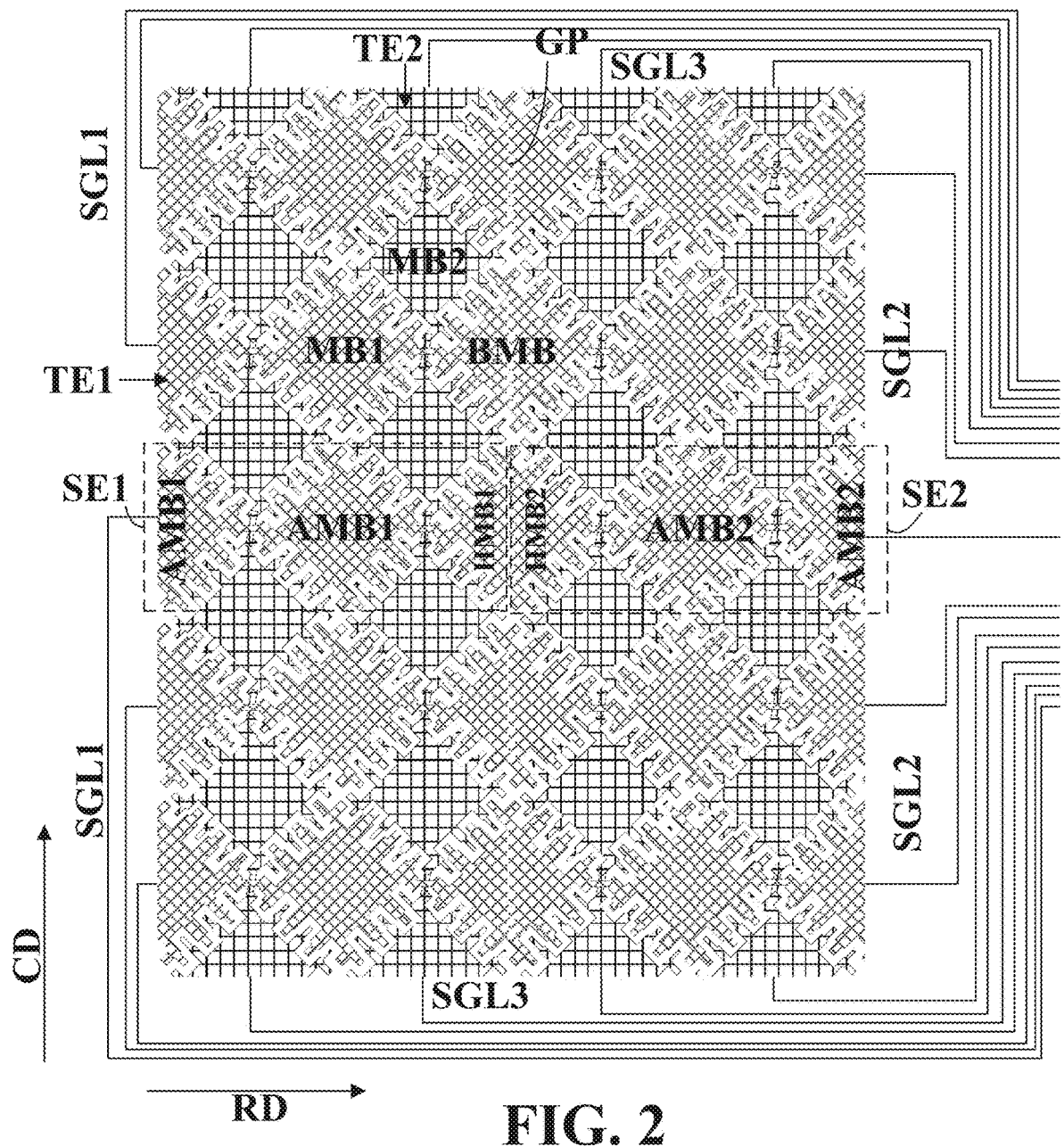
FIG. 2 is a schematic diagram illustrating the structure of a touch control structure in some embodiments according to the present disclosure.

FIG. 2 is a schematic diagram illustrating the structure of a touch control structure in some embodiments according to the present disclosure. Referring to FIG. 2, in some embodiments, the touch control structure further includes a plurality of first touch signal lines SGL1 respectively connected to the plurality of first sub-electrodes SE1; a plurality of second touch signal lines SGL2 respectively connected to the plurality of second sub-electrodes SE2; and a plurality of third touch signal lines SGL3 respectively connected to the plurality of second mesh electrodes TE2. Optionally, in a same respective row, a respective one of the plurality of first touch signal lines SGL1 is electrically connected to the multiple first adjacent mesh blocks AMB1 and the respective first half mesh block HMB1 in the respective one of the plurality of first sub-electrode SEls, and a respective one of the plurality of second touch signal lines SGL2 is electrically connected to the multiple second adjacent mesh blocks AMB2 and the respective second half mesh block HMB2 in the respective one of the plurality of second sub-electrodes SE2.

In some embodiments, the plurality of first touch signal lines SGL1 and the plurality of second touch signal lines SGL2 are touch sensing signal lines; and the plurality of third touch signal lines SGL3 are touch scanning signal lines configured to provide touch scanning signals respectively to the plurality of second mesh blocks respectively in the plurality of columns. Optionally, the plurality of first touch signal lines SGL1 and the plurality of second touch signal lines SGL2 are two independent sets of touch signals lines that are independently controlled.

In some embodiments, the plurality of first touch signal lines SGL1 and the plurality of second touch signal lines SGL2 are touch scanning signal lines configured to provide touch scanning signals respectively to the plurality of first sub-electrodes SE1 and the plurality of second sub-electrodes SE2; and the plurality of third touch signal lines SGL3 are touch sensing signal lines. Optionally, the plurality of first touch signal lines SGL1 and the plurality of second touch signal lines SGL2 are two independent sets of touch signals lines that are independently controlled.

Figure 3:
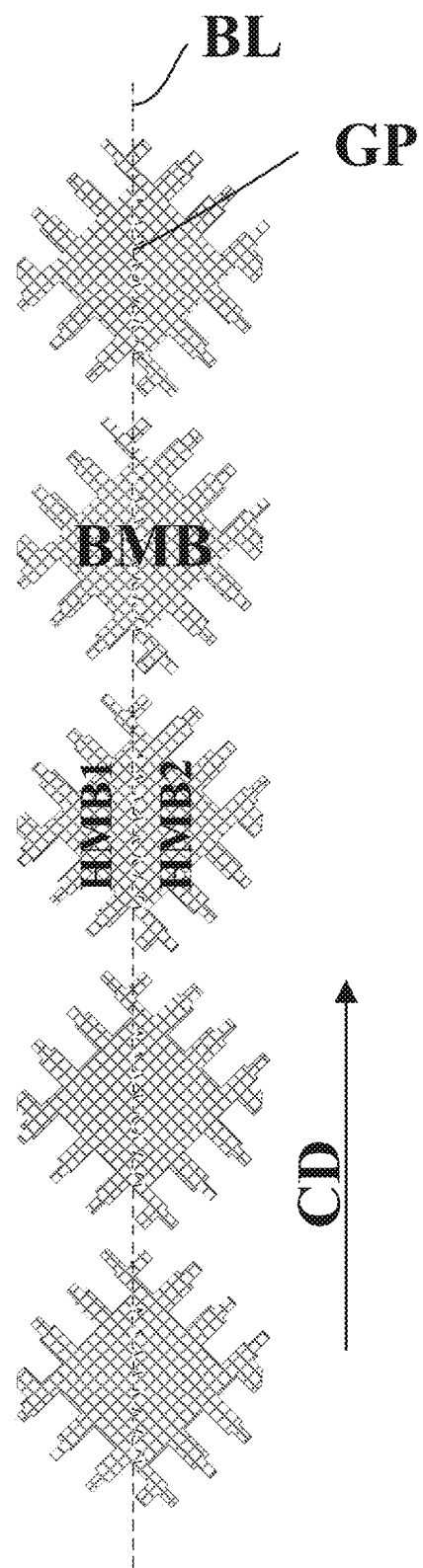
FIG. 3 is a schematic diagram illustrating the structure of a plurality of gaps respectively in a plurality of bendable mesh blocks along the column direction in some embodiments according to the present disclosure.

FIG. 3 is a schematic diagram illustrating the structure of a plurality of gaps respectively in a plurality of bendable mesh blocks along the column direction in some embodiments according to the present disclosure. Referring to FIG. 3, a respective gap GP of the plurality of gaps spaces apart a respective bendable mesh block BMB of the plurality of bendable mesh blocks into a respective first half mesh block HMB1 and a respective second half mesh block HMB2 directly adjacent to each other. In one example, the plurality of gaps are aligned along a direction substantially parallel to the column direction CD, the touch control structure being bendable along the plurality of gaps. As shown in FIG. 1, FIG. 2, and FIG. 3, the plurality of bendable mesh blocks are spaced apart from each other along the column direction CD. As used herein, the term "substantially parallel" means that an angle is in the range of 0 degree to approximately 45 degrees, e.g., 0 degree to approximately 5 degrees, 0 degree to approximately 10 degrees, 0 degree to approximately 15 degrees, 0 degree to approximately 20 degrees, 0 degree to approximately 25 degrees, 0 degree to approximately 30 degrees.

Figure 4:
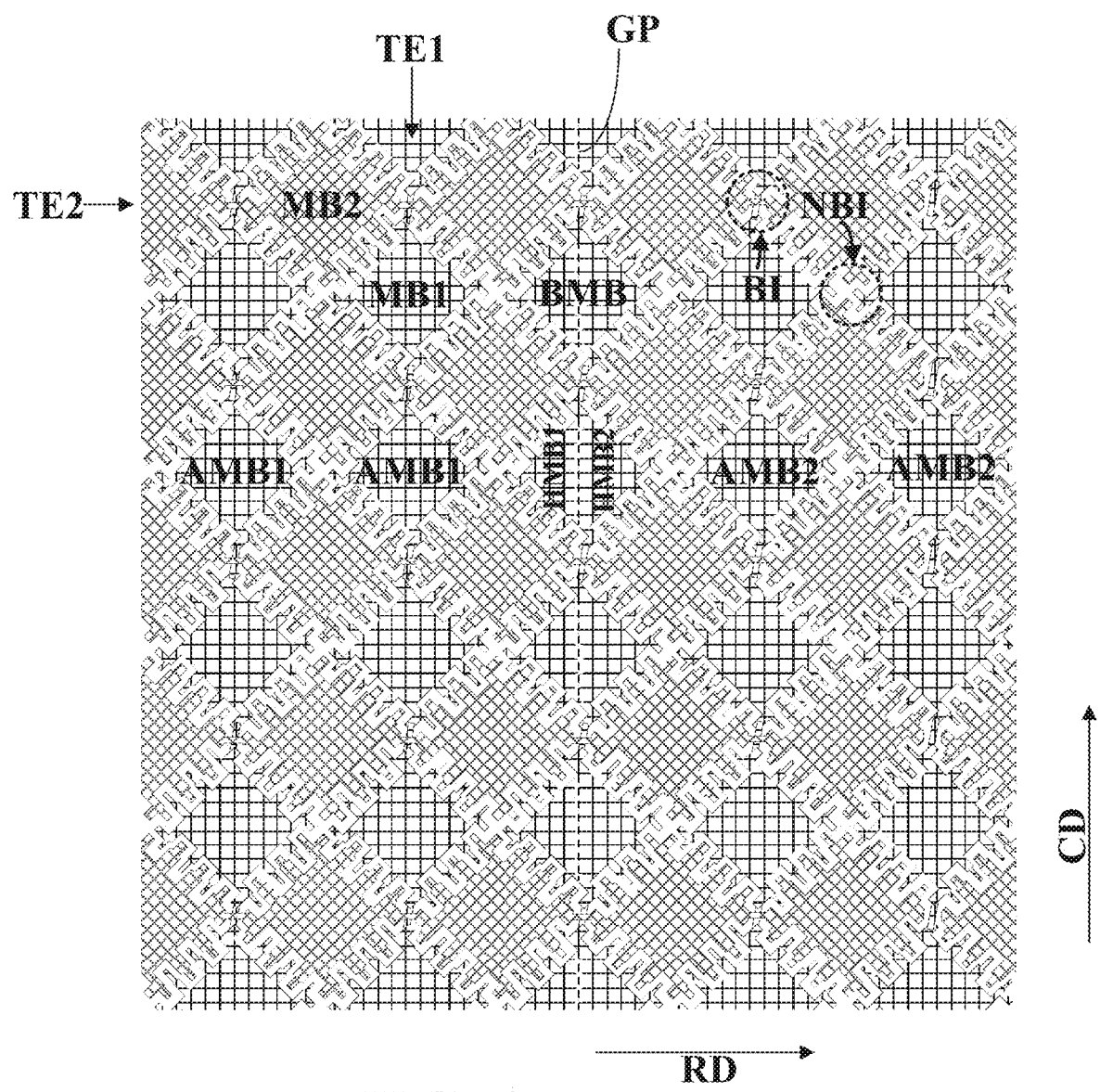
FIG. 4 is a schematic diagram illustrating the structure of a touch control structure in some embodiments according to the present disclosure.
Figure 5:
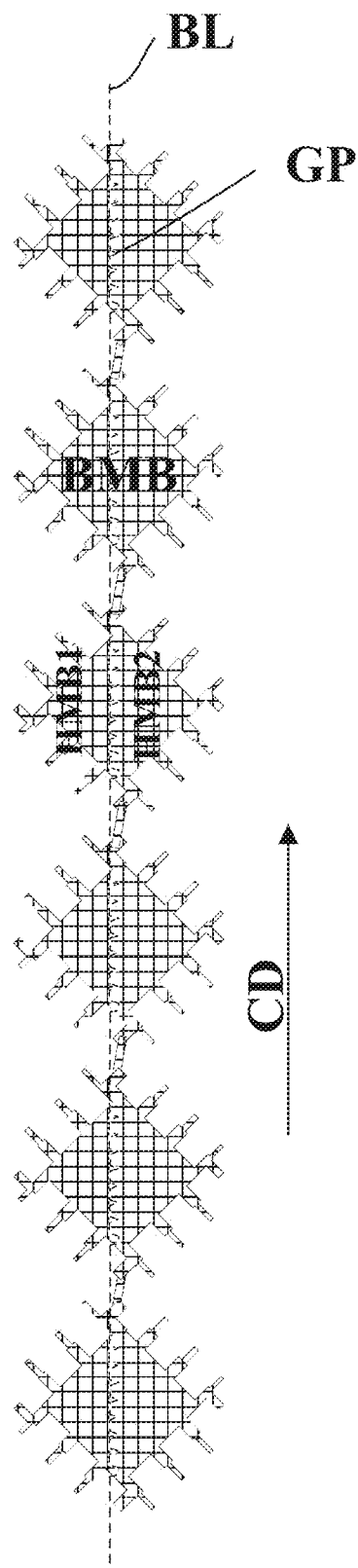
FIG. 5 is a schematic diagram illustrating the structure of a plurality of gaps respectively in a plurality of bendable mesh blocks along the column direction in some embodiments according to the present disclosure.

FIG. 4 is a schematic diagram illustrating the structure of a touch control structure in some embodiments according to the present disclosure. FIG. 5 is a schematic diagram illustrating the structure of a plurality of gaps respectively in a plurality of bendable mesh blocks along the column direction in some embodiments according to the present disclosure. Referring to FIG. 1 to FIG. 5, the touch control structure in some embodiments includes a plurality of gaps respectively in a plurality of bendable mesh blocks along a column direction CD. A respective gap GP of the plurality of gaps spaces apart a respective bendable mesh block BMB of the plurality of bendable mesh blocks into a respective first half mesh block HMB1 and a respective second half mesh block HMB2 directly adjacent to each other. As shown in FIG. 3 and FIG. 5, the plurality of gaps are aligned along a direction substantially parallel to the column direction CD, the touch control structure being bendable along the plurality of gaps.

Referring to FIG. 4 and FIG. 5, the plurality of bendable mesh blocks are connected to each other along the column direction CD. In one example, the plurality of bendable mesh blocks are connected through multiple bridges.

Figure 6A:
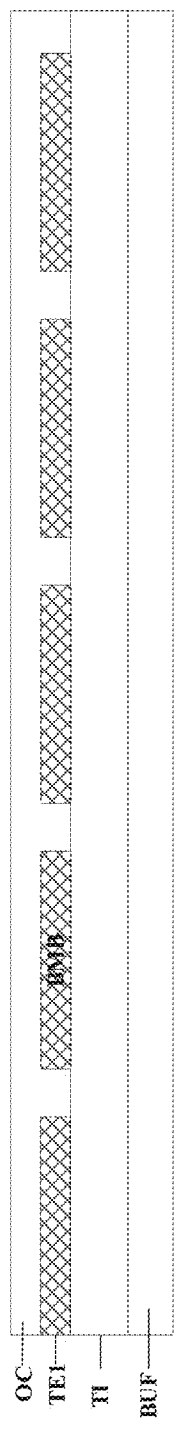
FIG. 6A is a cross-sectional view along a bendable line in FIG. 3.

FIG. 6A is a cross-sectional view along a bendable line in FIG. 3. Referring to FIG. 6A, the touch control structure in some embodiments includes a buffer layer BUF, a touch insulating layer TI on the buffer layer BUF, the plurality of bendable mesh blocks (including the respective bendable mesh block BMB) on a side of the touch insulating layer TI away from the buffer layer BUF, and an overcoat layer OC on a side of the plurality of bendable mesh blocks and touch insulating layer TI away from the buffer layer BUF.

Figure 6B:
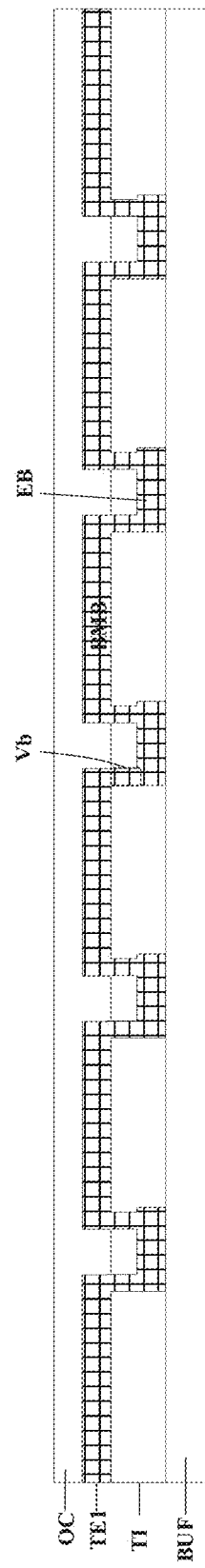
FIG. 6B is a cross-sectional view along a bendable line in FIG. 5.

FIG. 6B is a cross-sectional view along a bendable line in FIG. 5. Referring to FIG. 6B, the touch control structure in some embodiments includes a buffer layer BUF, a plurality of electrode bridge EB on the buffer layer BUF, a touch insulating layer TI on a side of the plurality of electrode bridge EB away from the buffer layer BUF, the plurality of bendable mesh blocks (including the respective bendable mesh block BMB) on a side of the touch insulating layer TI away from the buffer layer BUF, and an overcoat layer OC on a side of the plurality of bendable mesh blocks and touch insulating layer TI away from the buffer layer BUF. Adjacent bendable mesh blocks are connected through a respective one of the plurality of electrode bridge EB. The respective bendable mesh block BMB extends through a via vb through the touch insulating layer TI to connect to the respective one of the plurality of electrode bridge EB.

Referring to FIG. 1 and FIG. 4, in some embodiments, a respective row of the plurality of rows includes a plurality of first mesh blocks MB1 arranged along a row direction RD. The plurality of first mesh blocks MB1 in the respective row include the respective first half mesh block HMB1 and the respective second half mesh block HMB2 of the respective bendable mesh block BMB, multiple first adjacent mesh blocks AMB1, and multiple second adjacent mesh blocks AMB2 in a same row. The multiple first adjacent mesh blocks AMB1 are on a side of the respective bendable mesh block BMB away from the multiple second adjacent mesh blocks AMB2. In FIG. 1, the multiple first adjacent mesh blocks AMB1 and the respective first half mesh block HMB1 are electrically connected to each other; and the multiple second adjacent mesh blocks AMB2 and the respective second half mesh block HMB2 are electrically connected. In FIG. 4, however, the multiple first adjacent mesh blocks AMB1 are isolated from each other and isolated from the respective first half mesh block HMB1; and the multiple second adjacent mesh blocks AMB2 are isolated from each other and isolated from the respective second half mesh block HMB2.

Referring to FIG. 1 and FIG. 4, in some embodiments, a combination of the respective first half mesh block HMB1, the respective gap GP, and the respective second half mesh block HMB2, has a shape substantially same as a shape of an immediate adjacent first adjacent mesh block of the multiple first adjacent mesh blocks AMB1, the immediate adjacent first adjacent mesh block being most adjacent to the respective first half mesh block HMB1 among the multiple first adjacent mesh blocks AMB1. Optionally, the combination of the respective first half mesh block HMB1, the respective gap GP, and the respective second half mesh block HMB2, has a shape substantially same as a shape of an immediate adjacent second adjacent mesh block of the multiple second adjacent mesh blocks AMB2, the immediate adjacent second adjacent mesh block being most adjacent to the respective second half mesh block among the multiple second adjacent mesh blocks AMB2. In FIG. 1, the immediate adjacent first adjacent mesh block is connected to the respective first half mesh block HMB1, and the immediate adjacent second adjacent mesh block is connected to the respective second half mesh block HMB2. In FIG. 4, the immediate adjacent first adjacent mesh block is isolated from the respective first half mesh block HMB1, and the immediate adjacent second adjacent mesh block is isolated from the respective second half mesh block HMB2.

Referring to FIG. 1 and FIG. 4, in some embodiments, first mesh blocks of the plurality of rows of the plurality of first mesh electrodes TE1 and second mesh blocks of the plurality of columns of the plurality of second mesh electrodes TE2 are respectively arranged in interlaced matrices, forming a plurality of bridge intersections BI and a plurality of non-bridge intersections NBI. In a respective one of the plurality of non-bridge intersections NBI, adjacent mesh blocks (first mesh blocks and second mesh blocks) are spaced apart and insulated from each other. The touch control structure at a respective one of the plurality of bridge intersections BI includes an electrode bridge connecting two adjacent mesh blocks in a respective row and an electrode bridge connecting two adjacent mesh blocks in a respective column.

Referring to FIG. 1 and FIG. 3, in some embodiments, adjacent bendable mesh blocks of the plurality of bendable mesh blocks are spaced apart from each other along the column direction CD by the respective one of the plurality of non-bridge intersections NBI. The plurality of gaps and multiple non-bridge intersections respectively spacing apart the plurality of bendable mesh blocks along the column direction together form the bendable line BL along which the touch control structure is bendable.

Referring to FIG. 4 and FIG. 5, in some embodiments, adjacent bendable mesh blocks of the plurality of bendable mesh blocks are spaced apart from each other along the column direction CD by the respective one of the plurality of bridge intersections BI. The plurality of gaps and multiple bridge intersections respectively spacing apart the plurality of bendable mesh blocks along the column direction together form the bendable line BL along which the touch control structure is bendable.

Figure 7:
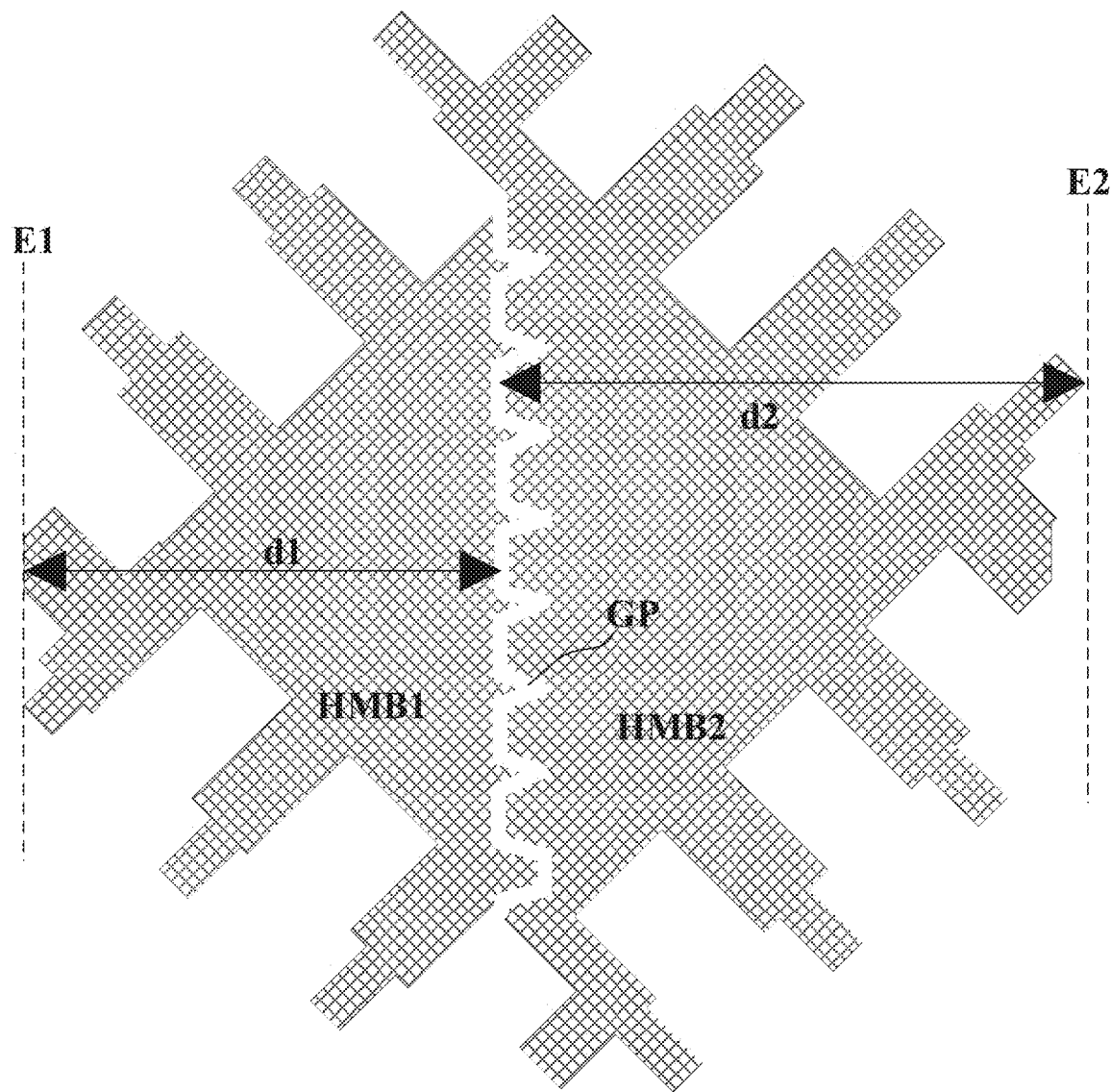
FIG. 7 illustrates a respective gap in a respective bendable mesh block in some embodiments according to the present disclosure.

FIG. 7 illustrates a respective gap in a respective bendable mesh block in some embodiments according to the present disclosure. Referring to FIG. 7, a maximum first distance d1 between the respective gap GP and a most distal edge E1 of the respective first half mesh block HMB1 is shown; a maximum second distance d2 between the respective gap GP and a most distal edge E2 of the respective first half mesh block HMB1 is shown. In some embodiments, the maximum first distance d1 and the maximum second distance d2 are within 50% of each other, e.g., within 45% of each other, within 40% of each other, within 35% of each other, within 30% of each other, within 25% of each other, within 20% of each other, within 15% of each other, within 10% of each other, or within 5% of each other. Optionally, the maximum first distance dl and the maximum second distance d2 are within 10% of each other.

Figure 8A:
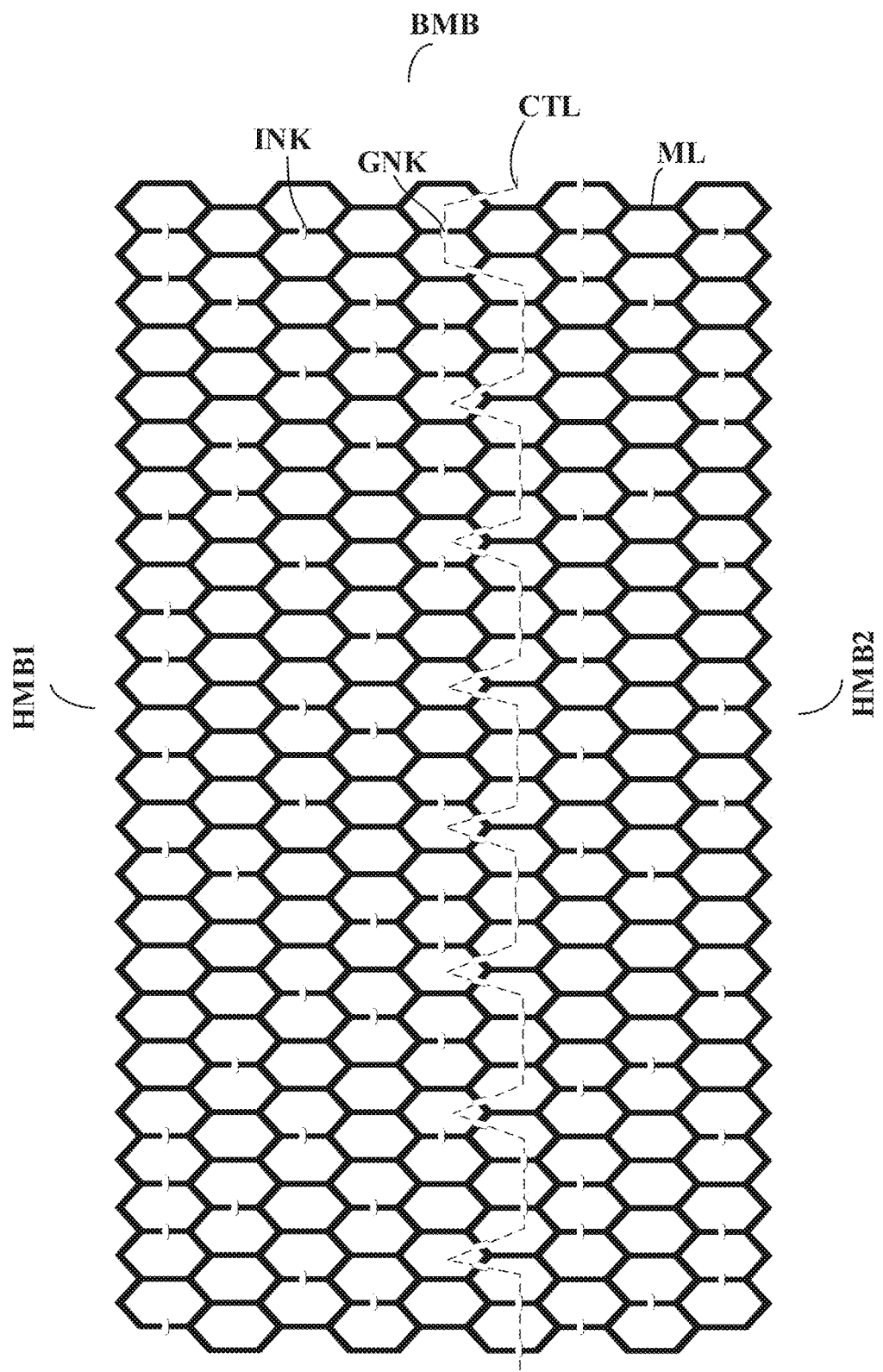
FIG. 8A is a zoom-in partial view of a respective gap in a respective bendable mesh block in some embodiments according to the present disclosure.

FIG. 8A is a zoom-in partial view of a respective gap in a respective bendable mesh block in some embodiments according to the present disclosure. Referring to FIG. 8A, in some embodiments, the respective gap includes a plurality of line opens GNK in mesh lines ML of the respective bendable mesh block BMB. Optionally, the respective bendable mesh block BMB further includes a plurality of internal line opens INK in the mesh lines ML. The plurality of internal line opens INK are individually distributed in the mesh lines ML. The plurality of internal line opens INK, individually or in combination, do not segregate the respective bendable mesh block BMB into insulated portions. However, the plurality of line opens GNK in combination segregate the respective bendable mesh block BMB into insulated portions. Specifically, the plurality of line opens GNK in combination segregate the respective bendable mesh block BMB into the respective first half mesh block HMB1 and the respective second half mesh block HMB2. A combination of the plurality of line opens GNK insulates the respective first half mesh block HMB1 and the respective second half mesh block HMB2 from each other. The plurality of line opens GNK has a contour line CTL.

The contour line CTL may have various appropriate shapes. In one example, the contour line CTL is a straight line. In another example, the contour line CTL is a curved line comprising a plurality of straight line sections. In another example, the contour line CTL is a curvilinear line.

Figure 8B:
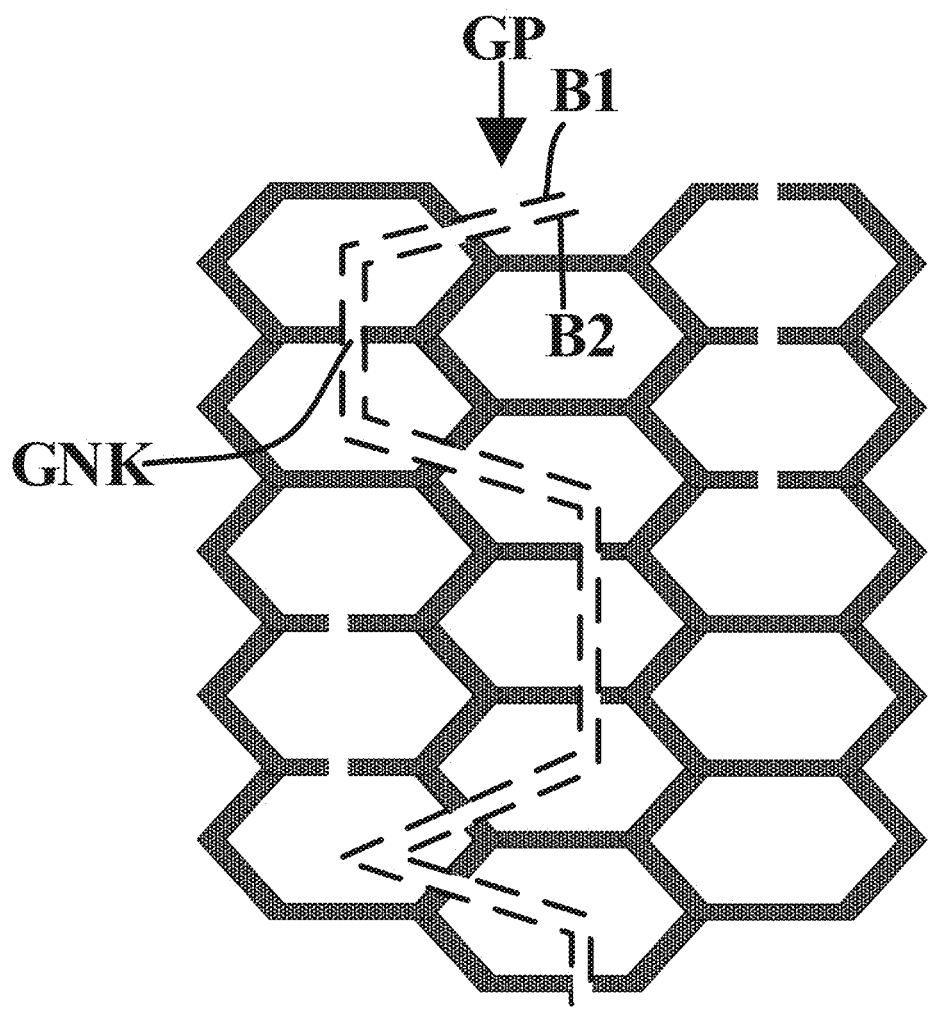
FIG. 8B is a further zoom-in partial view of a respective gap in a respective bendable mesh block in some embodiments according to the present disclosure.

FIG. 8B is a further zoom-in partial view of a respective gap in a respective bendable mesh block in some embodiments according to the present disclosure. Referring to FIG. 8B, the respective gap GP has a first boundary B1 formed by virtually connecting edges of mesh lines of the respective first half mesh block HMB1, and a second boundary B2 formed by virtually connecting edges of multiple mesh lines of the respective second half mesh block HMB2.

Figure 9:
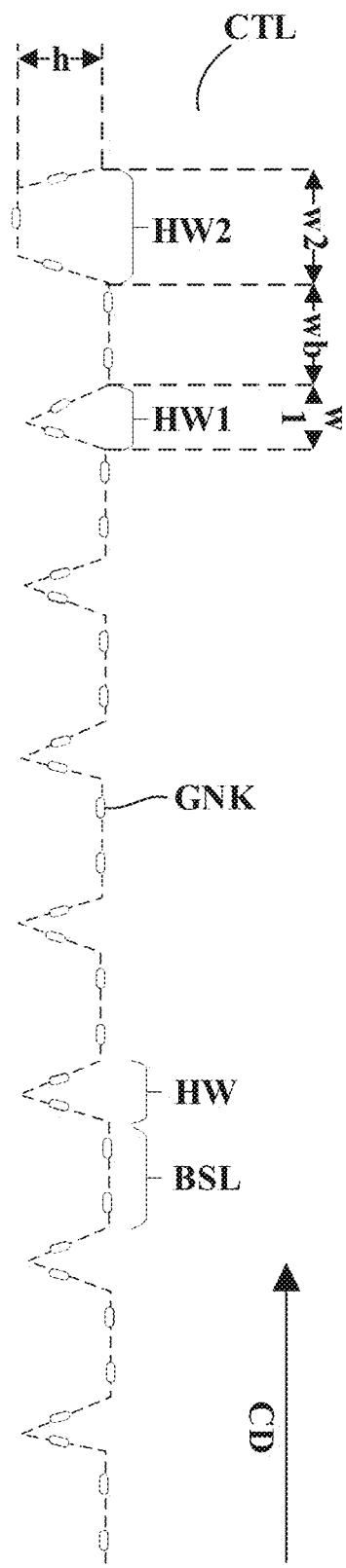
FIG. 9 illustrate a contour line of a plurality of line opens in some embodiments according to the present disclosure.

FIG. 9 illustrate a contour line of a plurality of line opens in some embodiments according to the present disclosure. Referring to FIG. 9, in some embodiments, the contour line CTL of the plurality of line opens GNK is an undulating contour line. In some embodiments, the undulating contour line includes alternating half waves HW and base lines BSL.

Optionally, the half waves HW have a uniform half wave form.

Optionally, the half waves HW have different half wave forms. FIG. 9 shows a first half wave HW1 and a second have wave HW2. The half wave HW1 and the second have wave HW2 have different half wave forms. In one example, the half wave HW1 has a triangular half wave form, and the second have wave HW2 has a trapezoidal half wave form. The inventors of the present disclosure discover that a contour line having different half wave forms enhances blanking effect of the touch control structure.

Optionally, the base lines BSL are aligned along a direction substantially parallel to the column direction CD.

Optionally, an average height h of the half waves HW is in a range of 30 µm to 90 µm, e.g., 30 µm to 40 µm, 40 µm to 50 µm, 50 µm to 60 µm, 60 µm to 70 µm, 70 µm to 80 µm, or 80 µm to 90 µm. Optionally, the average height h of the half waves HW is 60 µm.

Optionally, an average width wb of the base lines BSL is in a range of 40 µm to 160 µm, e.g., 40 µm to 50 µm, 50 µm to 60 µm, 60 µm to 70 µm, 70 µm to 80 µm, 80 µm to 90 µm, 90 µm to 100 µm, 100 µm to 110 µm, 110 pm to 120 µm, 120 µm to 130 µm, 130 µm to 140 µm, 140 µm to 150 µm, or 150 µm to 160 µm. Optionally, the average width wb of the base lines BSL is 80 µm.

Optionally, an average width w1 of the first half wave HW1 is in a range of 20 µm to 80 µm, e.g., 20 µm to 30 µm, 30 µm to 40 µm, 40 µm to 50 µm, 50 µm to 60 µm, 60 µm to 70 µm, or 70 µm to 80 µm. Optionally, the average width w1 of the first half wave HW1 is 40 µm.

Optionally, an average width w2 of the second half wave HW2 is in a range of 60 µm to 240 µm, 60 µm to 70 µm, 70 µm to 80 µm, 80 µm to 90 µm, 90 µm to 100 µm, 100 µm to 110 µm, 110 µm to 120 µm, 120 µm to 130 µm, 130 µm to 140 µm, 140 µm to 150 µm, 150 µm to 160 µm, 160 µm to 170 µm, 170 µm to 180 µm, 180 µm to 190 µm, 190 µm to 200 µm, 200 µm to 210 µm, 210 µm to 220 µm, 220 µm to 230 µm, or 230 µm to 240 µm. Optionally, the average width w2 of the second half wave HW2 is 120 µm.

Optionally, an average line width of the mesh lines ML is in a range of 1 µm to 10 µm, e.g., 1 µm to 2 µm, 2 µm to 3 µm, 3 µm to 4 µm, 4 µm to 5 µm, 5 µm to 6 µm, 6 µm to 7 µm, 7 µm to 8 µm, 8 µm to 9 µm, or 9 µm to 10 p.m. Optionally, the average line width of the mesh lines ML is 3 µm. Optionally, the average line width of the mesh lines ML is 4 µm.

Optionally, an average width of the plurality of line opens GNK is in a range of 2 µm to 12 µm, e.g., 2 µm to 3 µm, 3 µm to 4 µm, 4 µm to 5 µm, 5 µm to 6 µm, 6 µm to 7 µm, 7 µm to 8 µm, 8 µm to 9 µm, 9 µm to 10 µm, 10 µm to 11 µm, or 11 µm to 12 µm. Optionally, the average width of the plurality of line opens GNK is 6 µm.

Optionally, an average width of the plurality of internal line opens INK is in a range of 2 µm to 10 µm, e.g., 2 µm to 3 µm, 3 µm to 4 µm, 4 µm to 5 µm, 5 µm to 6 µm, 6 µm to 7 µm, 7 µm to 8 µm, 8 µm to 9 µm, or 9 µm to 10 µm. Optionally, the average width of the plurality of internal line opens INK is 5.2 µm.

Optionally, an average gap width of the respective gap GP is in a range of 2 µm to 12 µm, e.g., 2 µm to 3 µm, 3 µm to 4 µm, 4 µm to 5 µm, 5 µm to 6 µm, 6 µm to 7 µm, 7 µm to 8 µm, 8 µm to 9 µm, 9 µm to 10 µm, 10 µm to 11 µm, or 11 µm to 12 µm. Optionally, the average gap width of the respective gap GP is 6 µm.

In another aspect, the present disclosure provides a display panel having a touch control structure described herein or fabricated by a method described herein. The display panel includes a plurality of display elements, and a plurality of thin film transistors for driving the plurality of display elements. Optionally, the display elements includes a plurality of light emitting diodes, for example, in an organic light emitting diode display panel. Optionally, the display elements include a liquid crystal layer in a plurality of subpixels, for example, in a liquid crystal display panel.

Figure 10A:
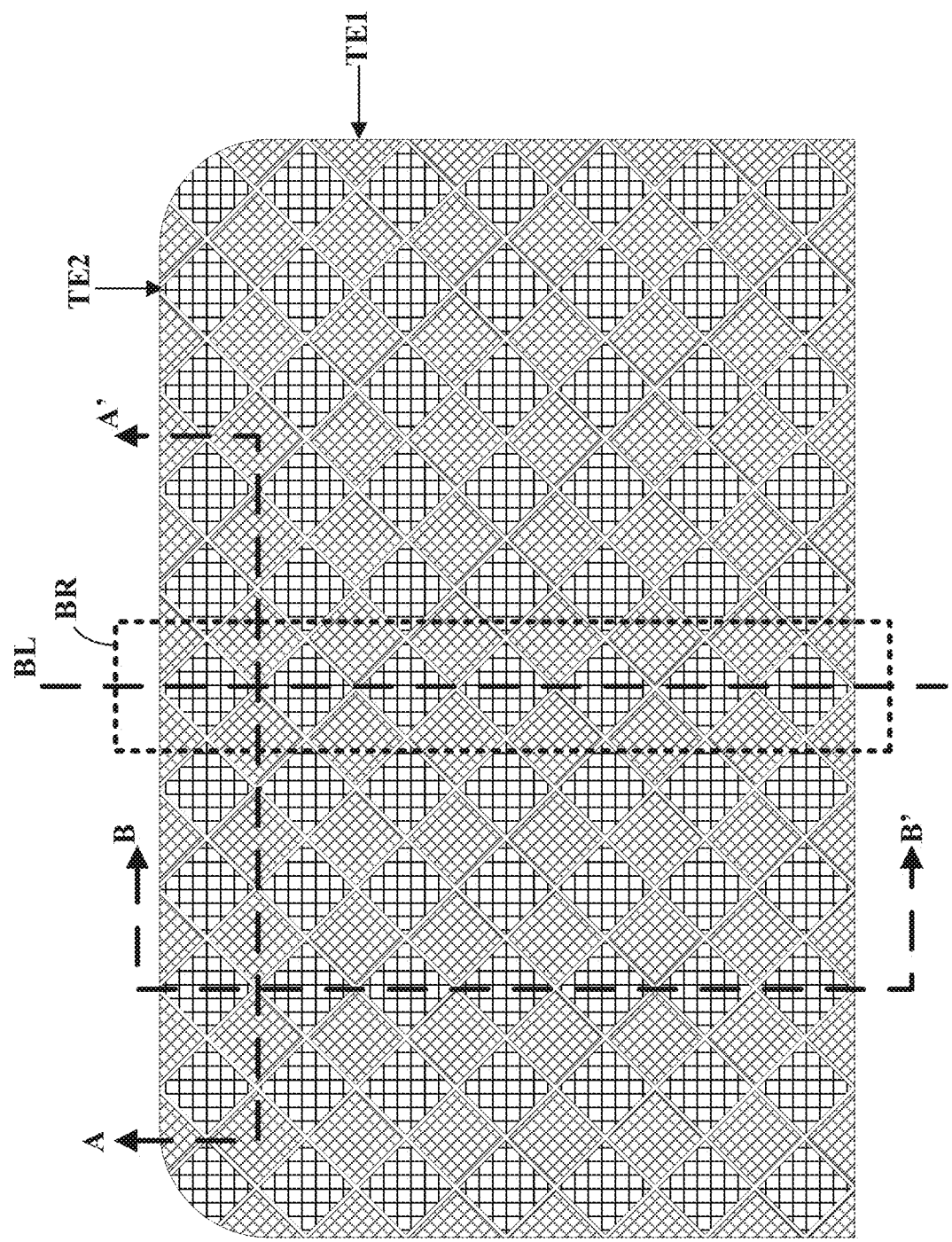
FIG. 10A is a plan view of a display panel in some embodiments according to the present disclosure.
Figure 10B:
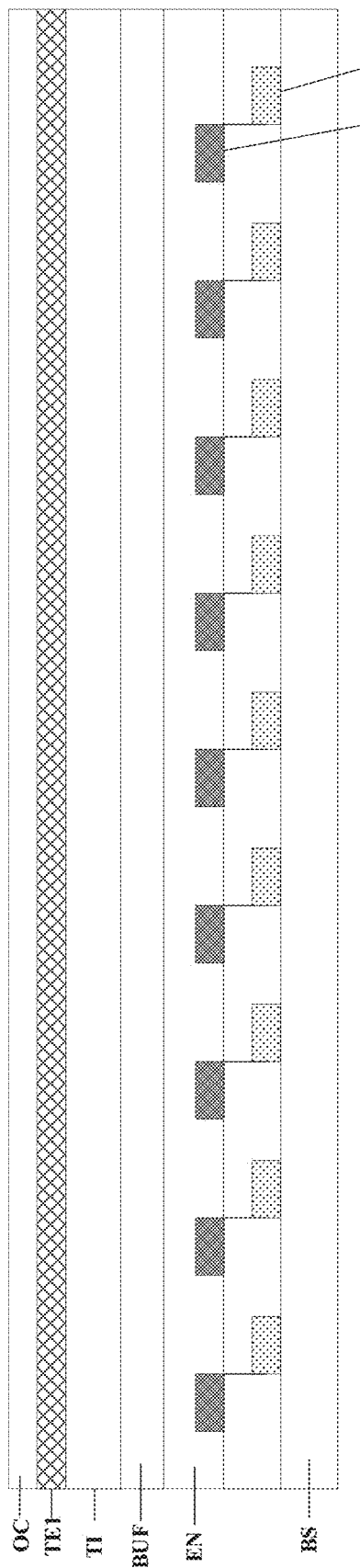
FIG. 10B is a cross-sectional view along an A-A' line in FIG. 10A.
Figure 10C:
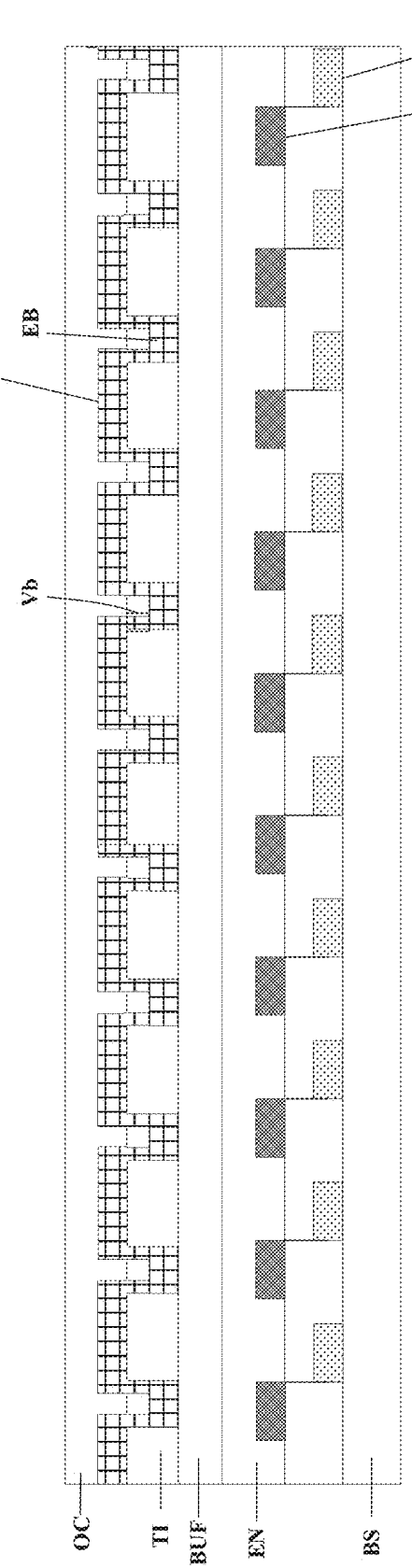
FIG. 10C is a cross-sectional view along a B-B' line in FIG. 10A.

FIG. 10A is a plan view of a display panel in some embodiments according to the present disclosure. FIG. 10B is a cross-sectional view along an A-A' line in FIG. 10A. FIG. 10C is a cross-sectional view along a B-B' line in FIG. 10A. In some embodiments, the display panel includes display elements and thin film transistors. Optionally, the display elements includes a plurality of light emitting diodes, for example, in an organic light emitting diode display panel. Optionally, the display elements include a liquid crystal layer in a plurality of subpixels, for example, in a liquid crystal display panel. Referring to FIGS. 10B to 10C, in some embodiments, the display panel includes a base substrate BS, a plurality of thin film transistors TFT on the base substrate BS, and a plurality of light emitting elements LE on the base substrate BS and respectively connected to the plurality of thin film transistors TFT.

In some embodiments, the display panel further includes an encapsulating layer EN encapsulating the plurality of light emitting elements LE, a buffer layer BUF on a side of the encapsulating layer EN away from the base substrate BS, a touch insulating layer TI on a side of the buffer layer BUF away from the encapsulating layer EN. Optionally, the touch control structure further includes a plurality of touch electrode bridges EB. The touch insulating layer TI is between the plurality of touch electrode bridges EB, and the electrode blocks of the plurality of first touch electrodes TE1 and the plurality of second touch electrodes TE2. The plurality of touch electrode bridges EB respectively extend through vias Vb in the touch insulating layer TI to respectively connect adjacent second electrode blocks in a respective column of the plurality of column of the plurality of second touch electrodes TE2.

In some embodiments, the plurality of first mesh electrodes TE1 and the plurality of second mesh electrodes TE2 are in a same layer as the second sub-layer of the double-layer structure described herein. The touch insulating layer TI is between the plurality of first mesh electrodes TE1 and the first sub-layer, and between the plurality of second mesh electrodes TE2 and the first sub-layer. In one example, the second connecting portion CP2, the third connecting portion CP3, the plurality of residual connecting bridges RCB, the first inner connecting bridge ICB1, the second inner connecting bridge ICB2, the plurality of first mesh electrodes TE1, and the plurality of second mesh electrodes TE2 are in a same layer.

In some embodiments, the plurality of touch electrode bridges EB, the first connecting portion CP1, the fourth connecting portion CP4, the fifth connecting portion CP5, the sixth connecting portion CP6, the seventh connecting portion CP7, are in a same layer as the first sub-layer of the double-layer structure described herein. The touch insulating layer TI is between the second sub-layer and each of the first connecting portion CP1, the fourth connecting portion CP4, the fifth connecting portion CP5, the sixth connecting portion CP6, the seventh connecting portion CP7, the plurality of touch electrode bridges EB.

In some embodiments, the display panel is a bendable display panel. In one example, the display panel has a bendable region BR where the display panel may be bendable. The bendable line BL depicted in connection with the touch control structure crosses over the bendable region BR. Optionally, the display panel is bendable along the bendable line BL.

Figure 11:
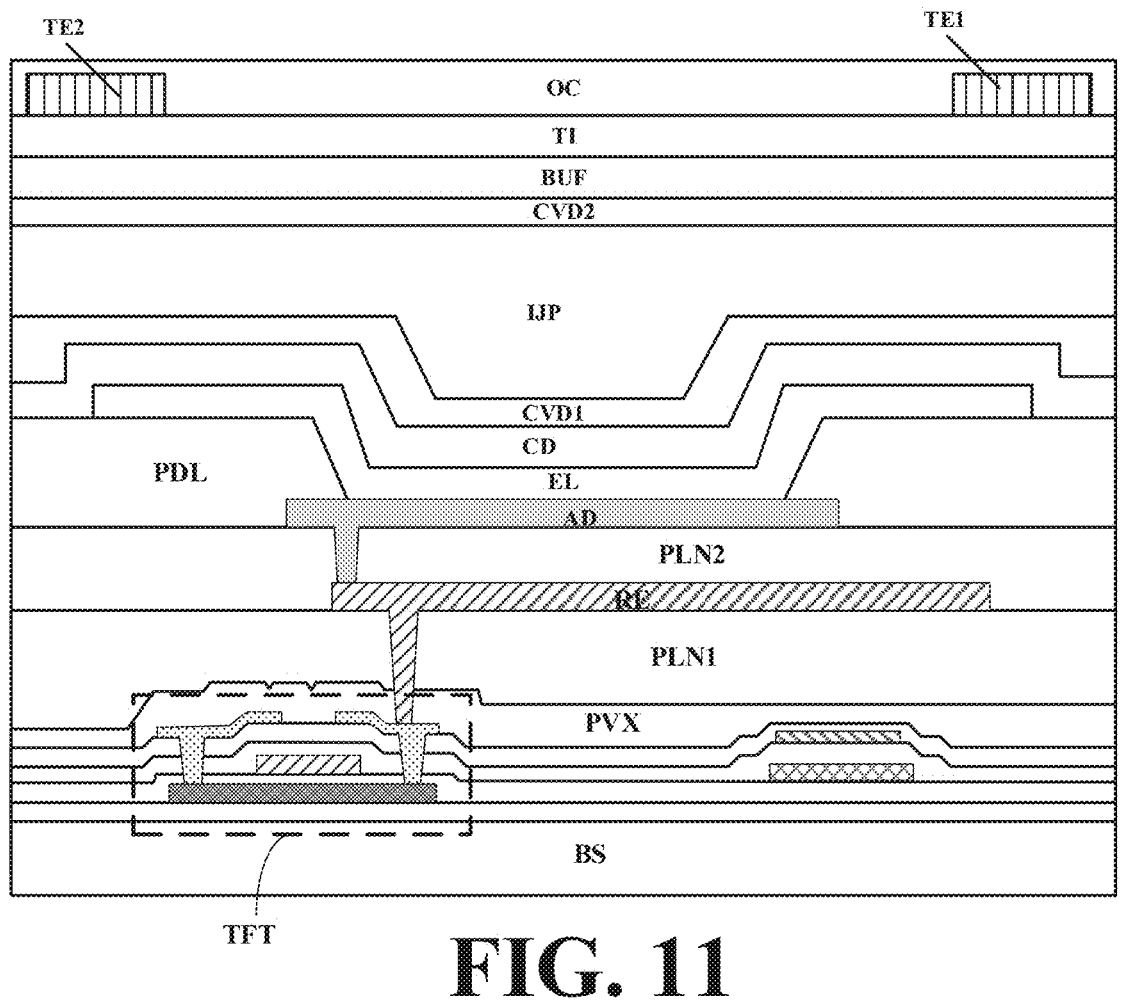
FIG. 11 is a cross sectional view of a display panel in some embodiments according to the present disclosure.

FIG. 11 is a cross sectional view of a display panel in some embodiments according to the present disclosure. Referring to FIG. 11, in the display region, the display panel includes a base substrate BS, a plurality of thin film transistors TFT on the base substrate BS, a passivation layer PVX on a side of the plurality of thin film transistors TFT away from the base substrate BS, a first planarization layer PLN1 on side of the passivation layer PVX away from the base substrate BS, a relay electrode RE on side of the first planarization layer PLN1 away from the passivation layer PVX, a second planarization layer PLN2 on a side of the relay electrode RE away from the first planarization layer PLN1, a pixel definition layer PDL on a side of the second planarization layer PLN2 away from the first planarization layer PLN1 and defining subpixel apertures, an anode AD on a side of the second planarization layer PLN2 away from the first planarization layer PLN1, a light emitting layer EL on a side of the anode AD away from the second planarization layer PLN2, a cathode CD on a side of the light emitting layer EL away from the anode AD, a first inorganic encapsulating layer CVD1 on a side of the cathode CD away from light emitting layer EL, an organic encapsulating layer IJP on a side of the first inorganic encapsulating layer CVD1 away from the cathode CD, a second inorganic encapsulating layer CVD2 on a side of the organic encapsulating layer IJP away from the first inorganic encapsulating layer CVD1, a buffer layer BUF on a side of the second inorganic encapsulating layer CVD2 away from the organic encapsulating layer IJP, a touch insulating layer TI on a side of the buffer layer BUF away from the second inorganic encapsulating layer CVD2, touch electrodes (e.g., the plurality of first touch electrodes TE1 and the plurality of second touch electrodes TE2 as shown in FIG. 11) on a side of the touch insulating layer TI away from the buffer layer BUF, and an overcoat layer OC on a side of the touch electrodes away from the touch insulating layer TI.

In another aspect, the present disclosure provides a display apparatus including a display panel described herein or fabricated by a method described herein, and one or more integrated circuits connected to the display panel. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

Figure 12:
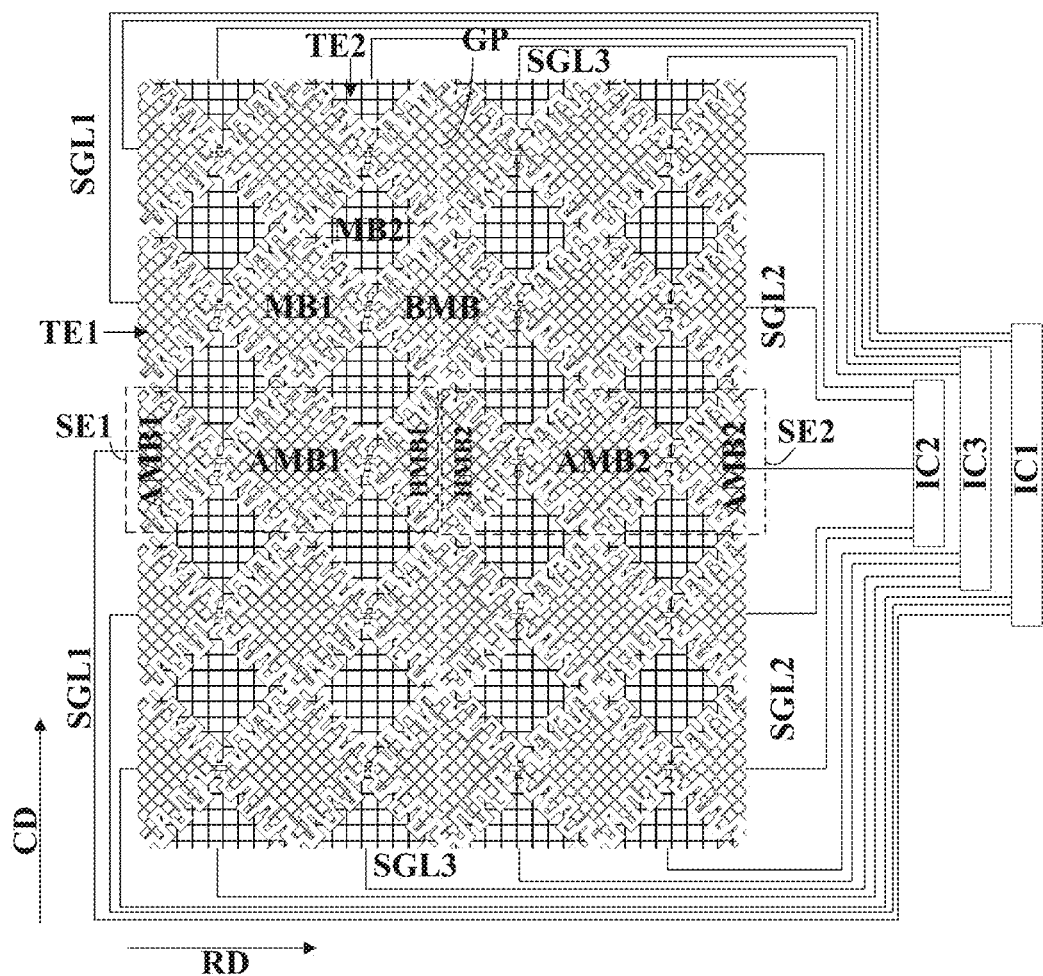
FIG. 12 is a schematic diagram illustrating the structure of a display apparatus having a touch control structure in some embodiments according to the present disclosure.

FIG. 12 is a schematic diagram illustrating the structure of a display apparatus having a touch control structure in some embodiments according to the present disclosure. Referring to FIG. 12, in some embodiments, the touch control structure includes a plurality of first touch signal lines SGL1 respectively connected to the plurality of first sub-electrodes SE1; a plurality of second touch signal lines SGL2 respectively connected to the plurality of second sub-electrodes SE2; and a plurality of third touch signal lines SGL3 respectively connected to the plurality of second mesh electrodes TE2. Optionally, in a same respective row, a respective one of the plurality of first touch signal lines SGL1 is electrically connected to the multiple first adjacent mesh blocks AMB1 and the respective first half mesh block HMB1 in the respective one of the plurality of first sub-electrode SE1s, and a respective one of the plurality of second touch signal lines SGL2 is electrically connected to the multiple second adjacent mesh blocks AMB2 and the respective second half mesh block HMB2 in the respective one of the plurality of second sub-electrodes SE2.

In some embodiments, the plurality of first touch signal lines SGL1 and the plurality of second touch signal lines SGL2 are touch sensing signal lines; and the plurality of third touch signal lines SGL3 are touch scanning signal lines configured to provide touch scanning signals respectively to the plurality of second mesh blocks respectively in the plurality of columns. Optionally, the plurality of first touch signal lines SGL1 and the plurality of second touch signal lines SGL2 are two independent sets of touch signals lines that are independently controlled.

In some embodiments, the plurality of first touch signal lines SGL1 and the plurality of second touch signal lines SGL2 are touch scanning signal lines configured to provide touch scanning signals respectively to the plurality of first sub-electrodes SE1 and the plurality of second sub-electrodes SE2; and the plurality of third touch signal lines SGL3 are touch sensing signal lines. Optionally, the plurality of first touch signal lines SGL1 and the plurality of second touch signal lines SGL2 are two independent sets of touch signals lines that are independently controlled.

In some embodiments, the display apparatus includes a plurality of touch control integrated circuits connected to the touch control structure. Optionally, the plurality of touch control integrated circuits includes a first touch control integrated circuit IC1 configured to control the plurality of first touch signal lines SGL1 and a second touch control integrated circuit IC2 configured to control the plurality of second touch signal lines SGL2. The plurality of first touch signal lines SGL1 are connected to the first touch control integrated circuit IC1. The plurality of second touch signal lines SGL2 are connected to the second touch control integrated circuit IC2. The plurality of third touch signal lines SGL3 may be simultaneously controlled.

Optionally, the plurality of third touch signal lines SGL3 are controlled by one of the first touch control integrated circuit IC1 and the second touch control integrated circuit IC2. Optionally, a first sub-set of the plurality of third touch signal lines SGL3 is controlled by the first touch control integrated circuit IC1, and a second sub-set of the plurality of third touch signal lines SGL3 is controlled by the second touch control integrated circuit IC2.

Optionally, the plurality of touch control integrated circuits further includes a third touch control integrated circuit IC3, and the plurality of third touch signal lines SGL3 are controlled by the third touch control integrated circuit IC3.

In some embodiments, the display apparatus is a bendable display apparatus. In one example, the display apparatus has a bendable region where the display apparatus may be bendable. The bendable line depicted in connection with the touch control structure crosses over the bendable region. Optionally, the display apparatus is bendable along the bendable line.

Figure 13:
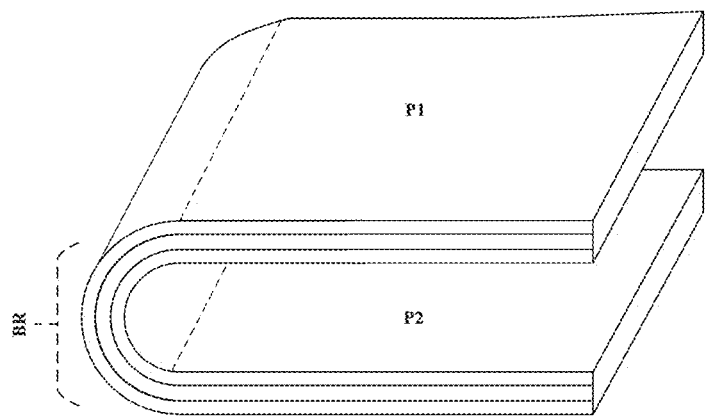
FIG. 13 is a schematic diagram illustrating a display apparatus in a folded state in some embodiments according to the present disclosure.

In another aspect, the present disclosure provides a method of driving a display apparatus. FIG. 13 is a schematic diagram illustrating a display apparatus in a folded state in some embodiments according to the present disclosure. Referring to FIG. 13, when the display apparatus is in a folded state, the display apparatus is bent in the bendable region BR. The display apparatus in the folded state has a first portion P1 and a second portion P2. In the folded state, a user is viewing an image displayed in the first portion P1, and applying a touch on a surface of the first portion P1. Thus, touch control in the second portion P2 is not desired when the display apparatus is in the folded state.

In some embodiments, and referring to FIG. 12 and FIG. 13, the method of driving the display apparatus includes, when the display apparatus is in the folded state, driving the plurality of first touch signal lines SGL1 using the first touch control integrated circuit IC1, thereby sensing a touch in the first portion P1. When the display apparatus is in the folded state, driving of the plurality of second touch signal lines SGL2 by the second touch control integrated circuit IC2 is disabled. Accordingly, when the display apparatus is in the folded state, only a touch on a surface in the first portion P1 is detected, and touch on a surface in the second portion P2 is not detected, obviating the floating issues associated with the touch detection in the second portion P2. Optionally, the method of driving the display apparatus further includes driving the plurality of third touch signal lines SGL3 by the third touch control integrated circuit IC3. Optionally, when the display apparatus is in the folded state, the first portion P1 is configured to display an image, and image display in the second portion P2 is turned off In another aspect, the present disclosure provides a method of fabricating a touch control structure. In some embodiments, the method includes forming a plurality of first mesh electrodes arranged in a plurality of rows and forming a plurality of second mesh electrodes arranged in a plurality of columns. Optionally, the method includes forming a plurality of gaps respectively in a plurality of bendable mesh blocks along a column direction. Optionally, a respective gap of the plurality of gaps is formed to space apart a respective bendable mesh block of the plurality of bendable mesh blocks into a respective first half mesh block and a respective second half mesh block directly adjacent to each other. Optionally, the plurality of gaps are aligned along a direction substantially parallel to the column direction, the touch control structure being bendable along the plurality of gaps.

In some embodiments, forming a respective row of the plurality of rows includes forming a plurality of first mesh blocks arranged along a row direction. Optionally, forming the plurality of first mesh blocks in the respective row includes forming the respective first half mesh block and forming the respective second half mesh block of the respective bendable mesh block, forming multiple first adjacent mesh blocks, and forming multiple second adjacent mesh blocks in a same row. Optionally, the multiple first adjacent mesh blocks are formed on a side of the respective bendable mesh block away from the multiple second adjacent mesh blocks.

In some embodiments, a combination of the respective first half mesh block, the respective gap, and the respective second half mesh block, has a shape substantially same as a shape of an immediate adjacent first adjacent mesh block of the multiple first adjacent mesh blocks, the immediate adjacent first adjacent mesh block being most adjacent to the respective first half mesh block among the multiple first adjacent mesh blocks.

In some embodiments, the combination of the respective first half mesh block, the respective gap, and the respective second half mesh block, has a shape substantially same as a shape of an immediate adjacent second adjacent mesh block of the multiple second adjacent mesh blocks, the immediate adjacent second adjacent mesh block being most adjacent to the respective second half mesh block among the multiple second adjacent mesh blocks.

In some embodiments, forming the plurality of first mesh electrodes includes forming a plurality of first sub-electrodes and forming a plurality of second sub-electrodes. Optionally, forming a respective one of the plurality of first mesh electrodes includes forming a respective one of the plurality of first sub-electrodes and forming a respective one of the plurality of second sub-electrodes. Optionally, forming a respective column of the plurality of columns includes forming a plurality of second mesh blocks electrically connected together and arranged along a column direction. Optionally, forming a respective row of the plurality of rows includes forming a plurality of first mesh blocks arranged along a row direction. Optionally, forming the plurality of first mesh blocks in the respective row includes forming the respective first half mesh block and forming the respective second half mesh block of the respective bendable mesh block, forming multiple first adjacent mesh blocks, and forming multiple second adjacent mesh blocks in a same row. Optionally, the multiple first adjacent mesh blocks and the respective first half mesh block are formed to be electrically connected to each other, forming the respective one of the plurality of first sub-electrodes. Optionally, the multiple second adjacent mesh blocks and the respective second half mesh block are formed to be electrically connected, forming the respective one of the plurality of second sub-electrodes that is spaced apart from the respective one of the plurality of first sub-electrodes by the respective gap.

In some embodiments, the method further includes forming a plurality of first touch signal lines respectively connected to the plurality of first sub-electrodes; forming a plurality of second touch signal lines respectively connected to the plurality of second sub-electrodes; and forming a plurality of third touch signal lines respectively connected to the plurality of second mesh electrodes. Optionally, in a same respective row, a respective one of the plurality of first touch signal lines is formed to be electrically connected to the multiple first adjacent mesh blocks and the respective first half mesh block in the respective one of the plurality of first sub-electrodes, and a respective one of the plurality of second touch signal lines is formed to be electrically connected to the multiple second adjacent mesh blocks and the respective second half mesh block in the respective one of the plurality of second sub-electrodes.

In some embodiments, the plurality of first touch signal lines and the plurality of second touch signal lines are touch sensing signal lines. Optionally, the plurality of first touch signal lines and the plurality of second touch signal lines are two independent sets of touch signals lines that are independently controlled. Optionally, the plurality of third touch signal lines are touch scanning signal lines configured to provide touch scanning signals respectively to the plurality of second mesh blocks respectively in the plurality of columns.

In some embodiments, the plurality of bendable mesh blocks are formed to be spaced apart from each other along the column direction.

In some embodiments, first mesh blocks of the plurality of rows of the plurality of first mesh electrodes and second mesh blocks of the plurality of columns of the plurality of second mesh electrodes are respectively arranged in interlaced matrices, forming a plurality of bridge intersections and a plurality of non-bridge intersections. Optionally, in a respective one of the plurality of non-bridge intersections, adjacent mesh blocks are formed to be spaced apart and insulated from each other. Optionally, adjacent bendable mesh blocks of the plurality of bendable mesh blocks are formed to be spaced apart from each other along the column direction by the respective one of the plurality of non-bridge intersections. Optionally, the plurality of gaps and multiple non-bridge intersections respectively spacing apart the plurality of bendable mesh blocks along the column direction together form the bendable line along which the touch control structure is bendable.

In some embodiments, forming the respective gap includes forming a plurality of line opens in mesh lines of the respective bendable mesh block. Optionally, a combination of the plurality of line opens is formed to insulate the respective first half mesh block and the respective second half mesh block from each other. Optionally, a contour line of the plurality of line opens is an undulating contour line.

In some embodiments, the undulating contour line includes alternating half waves and base lines.

In some embodiments, at least two of the half waves have different wave forms.

In some embodiments, the different wave forms comprise a triangular half wave form and a trapezoidal half wave form; and the base lines are aligned along a direction substantially parallel to the column direction.

Figure 14:
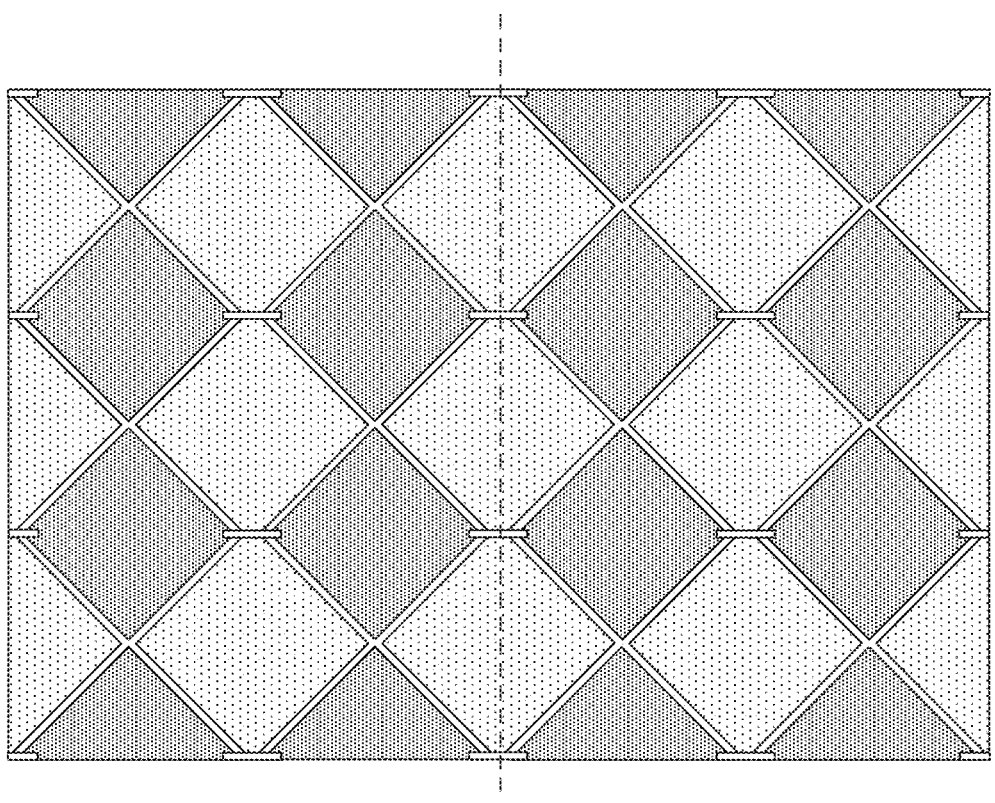
FIG. 14 illustrates a structural schematic view of a flexible touch panel.

Sometimes, due to poor flexibility of indium tin oxide (ITO) as shown in FIG. 14, the touch electrode pattern is prone to rupture nearby a bending line as shown by the dotted line in FIG. 14. When that happens, the flexible touch panel is destroyed.

Therefore, it is a technical problem to be solved to prevent the rupture of the touch electrode pattern from affecting the touch operation performance during use of the foldable type flexible touch panel.

Example implementations of the flexible touch panel and a display device according to embodiments of the present disclosure are described below in detail with reference to figures.

Shapes and sizes of components in the figures do not reflect real scale of the flexible touch panel and are only intended to illustrate the content of the present disclosure.

As shown in FIG. 15 through FIG. 20, a flexible touch panel according to some embodiments of the present disclosure may include: a flexible substrate baseplate 100, a touch electrode layer having a plurality of touch electrode patterns on the flexible substrate baseplate, and the flexible touch electrode pattern 200 disposed on the flexible substrate baseplate 100, and the flexible touch panel has at least one bendable area, and at least one of the touch electrode patterns within the bendable area 300 has a cutoff region to divide one electrode pattern into insulated portions.

The bendable area 300 arranged on the flexible touch panel and having at least one relatively fixed position, where at least part of the flexible touch electrode pattern 200 in the bendable area 300 has a cutoff region A that may divide the electrode pattern into two substantially complementary portions. Each of the touch electrode patterns within the bendable area has the cutoff region to divide the one electrode pattern into the insulated portions.

The bendable area 300 in the touch panel may be bended when needed. When the bendable area 300 is bended, the touch panel may be folded into two or multiple folds from a flat touch panel. Not all areas of the touch panel may be bent. When the touch panel is folded, the bendable area 300 may be bent and the rest of areas of the touch panel may not be bent, and may be the relatively fixed positions. The purpose of the bendable area 300 is for the touch panel to be folded. Sometimes, the bendable area 300 may have a cutoff region that may have a substantially 90% difference from the direction of the folding of the touch panel. For example, in FIG. 19, each bendable area 300 has a cutoff region that has a horizontal direction while the touch panel may be folded vertically. Thus, the flexible touch panel may have one bendable area, the flexible touch panel may be bendable along a first direction, and an extension direction of the bendable area may be along a second direction that is substantially perpendicular to the first direction. The cutoff region may substantially extend along the extension direction of the bendable area. As such, all the touch electrode patterns within the bendable area may have the cutoff region to divide one electrode pattern into two insulated portions, and the two insulated portions may be distributed symmetrically in respect to the cutoff region.

Figure 16:
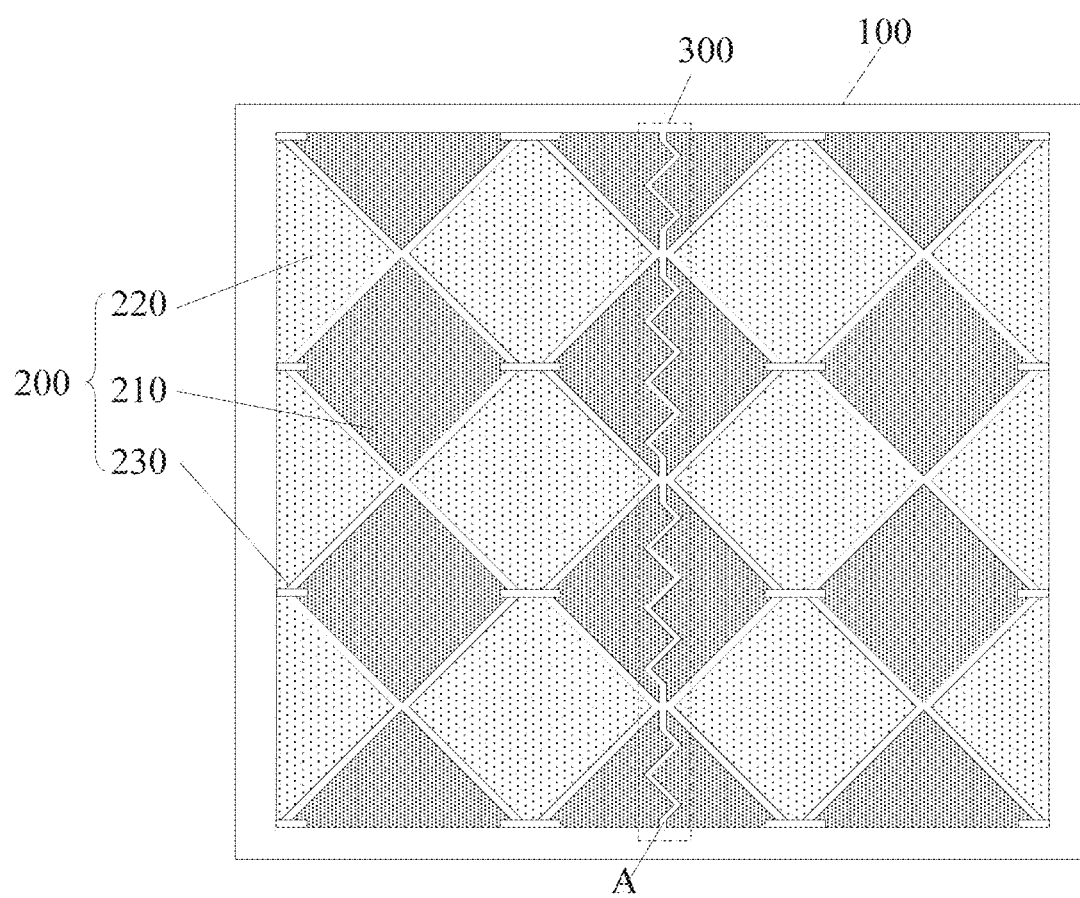
FIG. 16 illustrates a second structural schematic view of a flexible display panel according to some embodiments of the present disclosure.
Figure 17:
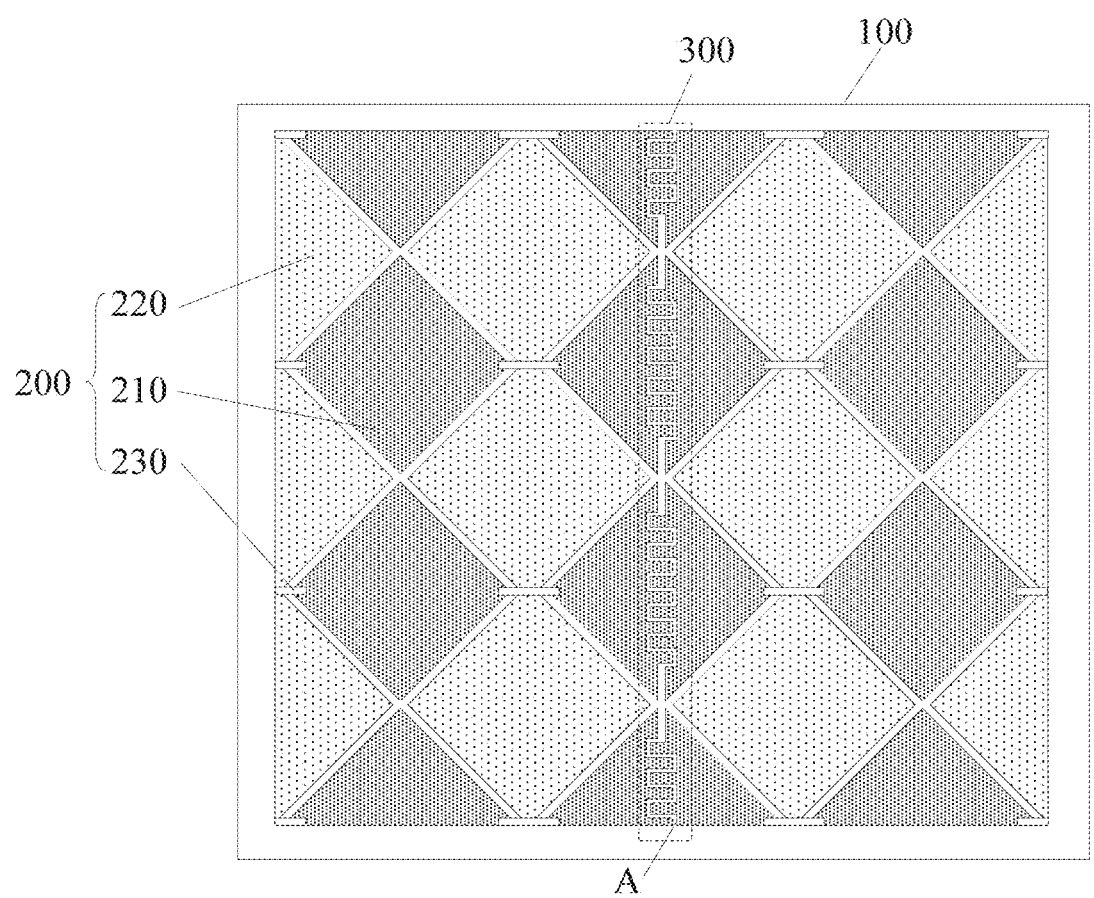
FIG. 17 illustrates a third structural schematic view of a flexible display panel according to some embodiments of the present disclosure.

However, as shown in FIG. 16 and FIG. 17, sometimes, even though the direction of the folding is substantially vertical, the bendable area 300 may have the cutoff regions with more than one directions. Such directions may or may not be the same.

Thus, connections of all cutoff regions within the bendable area bendable may be substantially a straight line as a whole. Sometimes, connections of all cutoff regions within the bendable area are substantially a bent line as a whole as shown in FIG. 16 and FIG. 17.

For example, in the embodiments illustrated in FIG. 16 and FIG. 17, the cutoff region A extends along a direction parallel to the substrate baseplate (e.g., in the state of being flat without being bent). For example, the cutoff region has a width in the direction perpendicular to the extending direction can be designed as small as possible, e.g, less than 10 μm. For example, the width can be 6 μm or 2 μm.

In the flexible touch panel, the flexible touch electrode pattern 200 may be liable for the rupture in the bendable area 300 which is at a relatively fixed position. A transparent electrically conductive material with poor flexibility such as ITO may be selected, for optical performance, as the material for making the flexible touch electrode pattern 200. Therefore, in the bendable area 300 which is liable to rupture, at least part of the flexible touch electrode pattern 200 is directly arranged with the cutoff region A.

However, when at least part of the flexible touch electrode pattern 200 disposed in the bendable area 300 is removed, the location at the cutoff region A may be enabled to release stress when it is bent. Thus, damages caused by the stress generated by the bending to the flexible touch electrode pattern 200 may be avoided in the bendable area 300, and at the same time, the removal of the part of flexible touch electrode pattern in the bendable area does not affect the touch operation performance.

It should be noted that the flexible touch panel according to the embodiment of the present disclosure may be adapted for a flexible display panel having a relatively fixed folding position. Generally, the bendable area 300 is located in the middle of the flexible touch panel, for example, on a central axis. Sometimes, the bendable area 300 may be disposed closely at an edge position of the flexible touch panel in accordance with the requirement of some applications. Also, the number of the bendable areas 300 may be one or more.

The following examples describe the scenarios that the bendable area 300 is disposed in the middle of the flexible touch panel. However, in practice, the bendable area 300 may be in the other areas of the flexible touch panel.

In the flexible touch panel according to the embodiment of the disclosure, at least part of the flexible touch electrode pattern 200 in the bendable area 300 is arranged to contain a cutoff region A. The flexible touch electrode patterns 200 on two sides of the cutoff region A may be independent from each other and may be spaced apart by the cutoff region A.

To ensure normal performance of touch detection, it is possible to respectively arrange a separated signal wiring connected with a touch chip at the flexible touch electrode patterns 200 on two sides of the cutoff region A. The flexible touch electrode patterns 200 on each side of the cutoff region A is connected with the touch chip via a corresponding signal wiring respectively.

When the flexible touch electrode pattern 200 is completely cut off at the bendable area 300 as shown in FIG. 15 through FIG. 18, the flexible touch electrode pattern 200 is divided into two completely independent pattern regions along the location of the cutoff region A. A left pattern and a right pattern as shown in the figures.

Thus, it is possible to respectively use an independent touch chip to control the left pattern and right pattern to execute the touch detection function. The flexible touch panel may be considered as two independent panels. The flexible touch electrode patterns 200 located on two sides of the cutoff region A may be respectively connected with different touch chips through respective signal wirings. Thus, touch electrode patterns located on two sides of the cutoff region may be connected by separated signal wirings and a single touch chip. Also, touch electrode patterns located on two sides of the cutoff region are connected by separated signal wirings and different touch chips.

In a possible implementation, one part of the touch electrode patterns may include touch driving electrodes and another part of the touch electrode patterns may include touch sense electrodes.

In the flexible touch panel according to the embodiment of the disclosure, to make the location of the cutoff region A of the flexible touch electrode pattern 200 in the bendable area 300 invisible as much as possible and to mitigate the impact on display consistency of the flexible touch panel, in one implementation, the location of the cutoff region A of the flexible touch electrode pattern 200 may be as small as possible. Thus, a gap of the cutoff region A should be as narrow as possible, and the pattern at the location of the cutoff region A may be designed as disorderly as possible to make the location not easily be noticed.

In one implementation, in the flexible touch panel according to the embodiment of the disclosure, the flexible touch electrode pattern 200, as shown in FIG. 15 through FIG. 20, generally may include: touch driving electrodes 210 and touch induction electrodes 220. An extension direction of the touch driving electrodes 210 may be a horizontal direction as shown in FIG. 15 through FIG. 20. Correspondingly, an extension direction of the touch induction electrodes 220 may be a vertical direction. Alternatively, the extension direction of the touch driving electrodes 210 may be a vertical direction, and correspondingly, the extension direction of the touch induction electrodes 220 may be a horizontal direction. The extension directions may have many variations. The touch driving electrodes 210 and touch induction electrodes 220 may be generally shaped as a diamond.

As shown in FIG. 15 through FIG. 20, each of the touch driving electrodes 210 comprises a plurality of electrode blocks which are connected in sequence. The arrangement direction of the electrode blocks in each touch driving electrode is the horizontal direction, i.e., it is the extension direction of the touch driving electrode 210. The arrangement direction of the electrode blocks in each touch induction electrode 220 is the vertical direction, i.e., it is the extension direction of the touch induction electrode 220.

In some embodiments, as shown in FIG. 15 through FIG. 20, the electrode blocks in the touch driving electrodes 210 and touch induction electrodes 220 may be shaped as square or circle. In some embodiments, the electrode blocks in the touch driving electrodes 210 and the electrode blocks in the touch induction electrodes 220 are shaped as the same. In some embodiments, shapes of the electrode blocks in the touch driving electrodes 210 and the electrode blocks in the touch induction electrodes 220 are different from each other.

Figure 15:
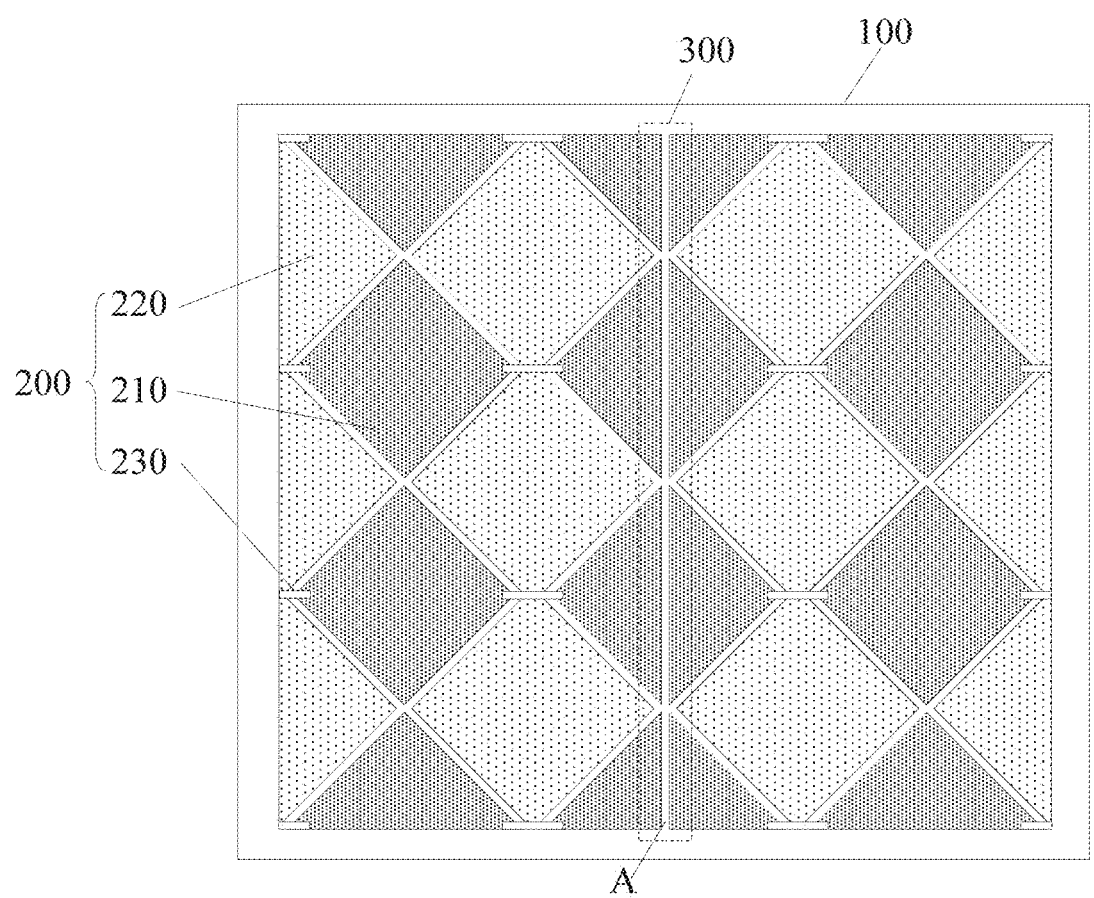
FIG. 15 illustrates a first structural schematic view of a flexible display panel according to some embodiments of the present disclosure.

The flexible touch electrode pattern 200, as shown in FIG. 15 through FIG. 20, generally may include: a jumper line 230 that bridges adjacent electrode blocks in the touch driving electrodes 210 or adjacent electrode blocks in the touch induction electrodes 220. For example, as shown in FIG. 15 through FIG. 20, the electrode blocks in each touch driving electrode are connected with the jumper line 230 so as to form the touch driving electrode extending along the horizontal direction. For the electrode blocks in the touch induction electrode, the adjacent electrode blocks can be directly connected with each other or connected with a connection line integrally formed with the electrode blocks. The bendable area may have at least one jumper line, and at least part of the at least one jumper line within the bendable area may be in the cutoff region of the bendable area. In FIG. 15 through FIG. 20, the example is provided to show the jumper line 230 to bridge adjacent electrode blocks of the touch driving electrodes 210. The jumper line may also bridge adjacent touch induction electrodes which is not shown in FIG. 15 through FIG. 20. Thus, a plurality of jumper line with each electrically connecting adjacent touch electrode patterns. For example, the first touch electrode 210 includes a plurality of first touch electrode blocks (the square as illustrated in FIG. 15) arranged in the first direction (e.g., the horizontal direction in FIG. 15), every two first touch electrode blocks adjacent along the first direction are connected by a first connecting portion. The second touch electrode 220 includes a plurality of second touch electrode blocks (the square as illustrated in FIG. 15) arranged in the second direction (e.g., the vertical direction in FIG. 15), every two second touch electrode blocks adjacent along the second direction are connected by a second connecting portion. For example, one of the first connecting portion and the second connecting portion is the jumper line as described above, and the other one can be a portion integral with the touch electrode blocks and between adjacent touch electrode blocks. In FIG. 2, as an example, the first connecting portion is the jumper line 230, and the second connecting portion is the portion between adjacent second touch electrode blocks and shielded by the jumper line 230.

In the flexible touch panel according to the embodiment of the disclosure, the touch driving electrodes 210 and touch induction electrodes 220 included by the flexible touch electrode pattern 200 generally may use a transparent electrically conductive material such as ITO. The jumper line 230 may use either a metallic material or a transparent electrically conductive material. The present disclosure does not limit the use of materials.

Based on the above flexible touch electrode pattern 200, in the flexible touch panel according to the embodiment of the disclosure, there may be the cutoff region A with different patterns depending on different structures of the flexible touch electrode pattern 200 included in the bendable area 300. Detailed depictions are provided by describing several examples below.

In the flexible touch panel according to the present embodiment, as shown in FIG. 15 through FIG. 17, the touch driving electrodes 210 or touch induction electrodes 220 included in the bendable area 300 have the cutoff region A in the extension direction of the bendable area 300.

For example, in the embodiments illustrated in FIG. 15 and FIG. 17, the cutoff region is located in the touch electrode blocks within the bendable area of the first touch electrodes 210.

In one implementation, the electrodes located in the cutoff region A need to be determined according to whether the flexible touch electrode pattern 200 included at the location of the bendable area 300 is in the touch driving electrodes 210 or touch induction electrodes 220. Each of FIG. 15 through FIG. 17 exemplarily illustrates the bendable area 300 covering the touch driving electrodes 210 as an example. In the extension direction of the bendable area 300, multiple touch driving electrodes 210 in the bendable area 300 contain the cutoff region A.

Specific graphs for performing the cutoff processing may employ multiple manners. For example, performing the cutoff processing may be in a straight line manner as shown in FIG. 15, performing the cutoff processing may be in a bent line manner as shown in FIG. 16 and FIG. 17, or performing the cutoff processing may be in a curved line manner. Performing the cutoff processing may also be in other ways which are not elaborated herein. In another implementation, the cutoff graph resulting from the cutoff processing in the bent line manner may be more disorderly than that resulting from the cutoff processing in the straight line manner and may not be easily noticed. However, the graphs other than the straight line may be more complicated, and may impose certain requirements for the precision of the manufacturing process.

As shown in FIG. 15, the touch driving electrodes 210 or touch induction electrodes 220 included in the bendable area 300 have a straight line cutoff region A in the extension direction of the bendable area 300. As shown in FIG. 16 and FIG. 17, the touch driving electrodes 210 or touch induction electrodes 220 included in the bendable area 300 have a bent line cutoff region A in the extension direction of the bendable area 300. When the cutoff processing is performed in the bent line manner, the touch driving electrodes 210 or touch induction electrodes 220 included in the bendable area 300 may have a serrated bent line cutoff region A as shown in FIG. 16 or a concave and convex bent line cutoff region A as shown in FIG. 17 in the extension direction of the bendable area 300.

In the flexible touch panel according to the present embodiment, when the touch driving electrodes 210 or touch induction electrodes 220 in the bendable area 300 are cut off, it may further perform a hollowing processing at the cutoff location to further release the stress during the bending.

Figure 18:
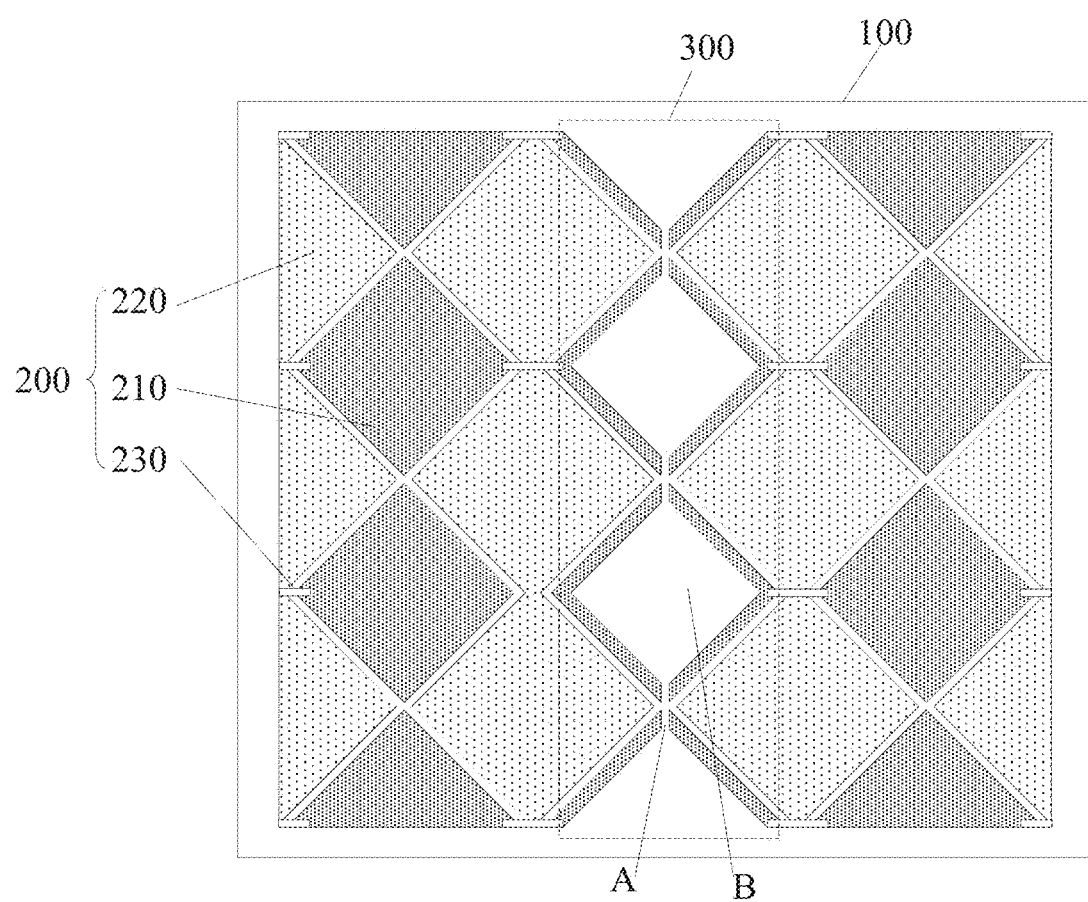
FIG. 18 illustrates a fourth structural schematic view of a flexible display panel according to some embodiments of the present disclosure.

As shown in FIG. 18, the touch driving electrodes 210 or touch induction electrodes 220 having the straight line cutoff region A further have a central hollowed region B including the cutoff region A. A central region of the touch driving electrodes 210 or touch induction electrodes 220 having the cutoff region A is hollowed on the basis of the cutoff region A. Thus, the touch electrode pattern within the bendable area may have the cutoff region with central hollowed portions.

Such hollowed region B and the cutoff region A in the hollowed region B may facilitate the folding of the touch panel. When the foldable area as shown in FIG. 18 is substantially hollowed, the touch panel may be folded along the cutoff region A without much resistance. Because the foldable area is hollowed, the touch panel may be folded repeatedly without wearing out the foldable area.

In one implementation, the shape of the hollow may vary. For example, it may be a shape such as circle, rectangle or polygon. However, a maximum hollowing degree should be a pattern line width that may be ensured by the capacity of the process. The hollowing should ensure integrity of outer contour of the touch driving electrodes 210 or touch induction electrodes 220. Each touch electrode pattern within the bendable area may have the cutoff region with central hollowed portions.

For example, as shown in FIG. 18, the central hollowed regions B of the touch driving electrodes 210 or touch induction electrodes 220 having the straight line cutoff region A are arranged to match the outer contour of the touch driving electrodes 210 or touch induction electrodes 220. The pattern line width of the touch driving electrodes 210 or touch induction electrodes 220 having the central hollowed regions B may be greater than 20 μm. Thus, the pattern line width of the outer contour of the touch electrode patterns within the bendable area may be greater than 20 μm.

In Example 1 and Example 2, by means of designing the location of the bendable area 300, it may ensure that the touch driving electrodes 210 or the touch induction electrodes 220 having the cutoff region A are distributed symmetrically in respect to the cutoff region A.

Figure 19:
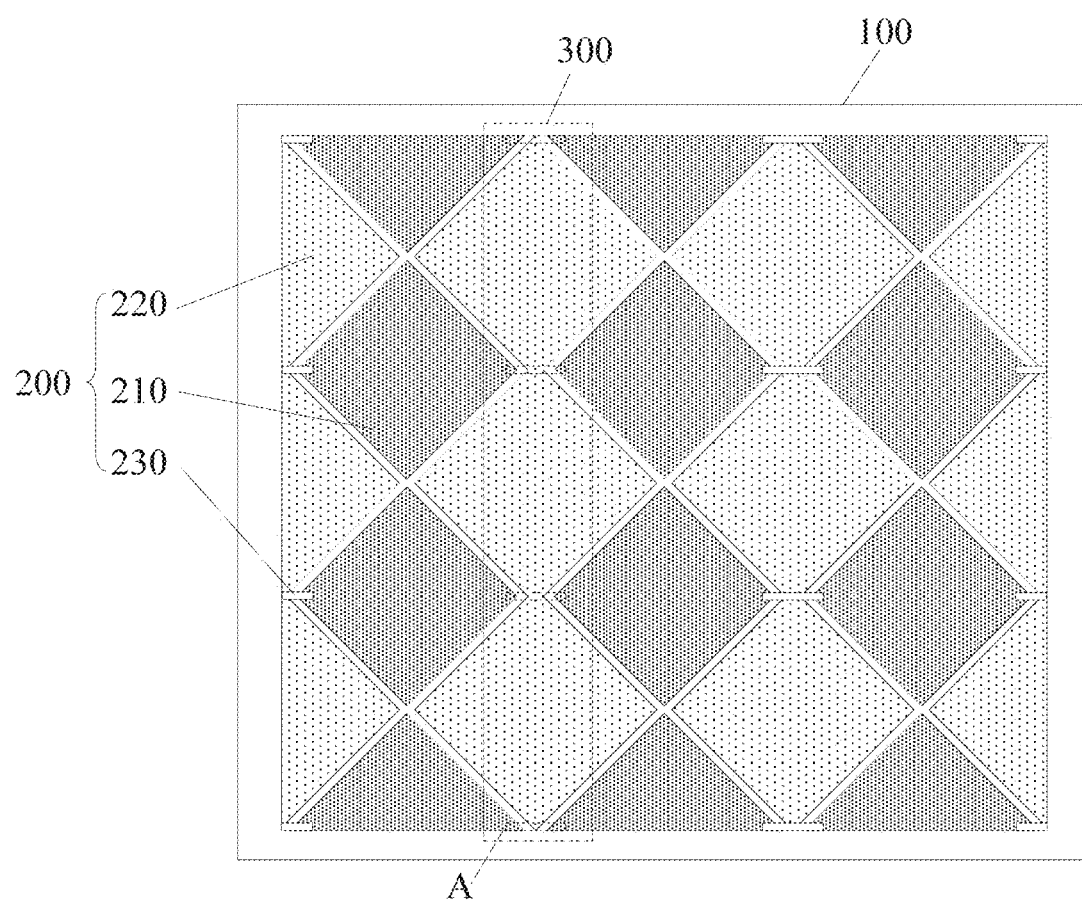
FIG. 19 illustrates a fifth structural schematic view of a flexible display panel according to some embodiments of the present disclosure.
Figure 20:
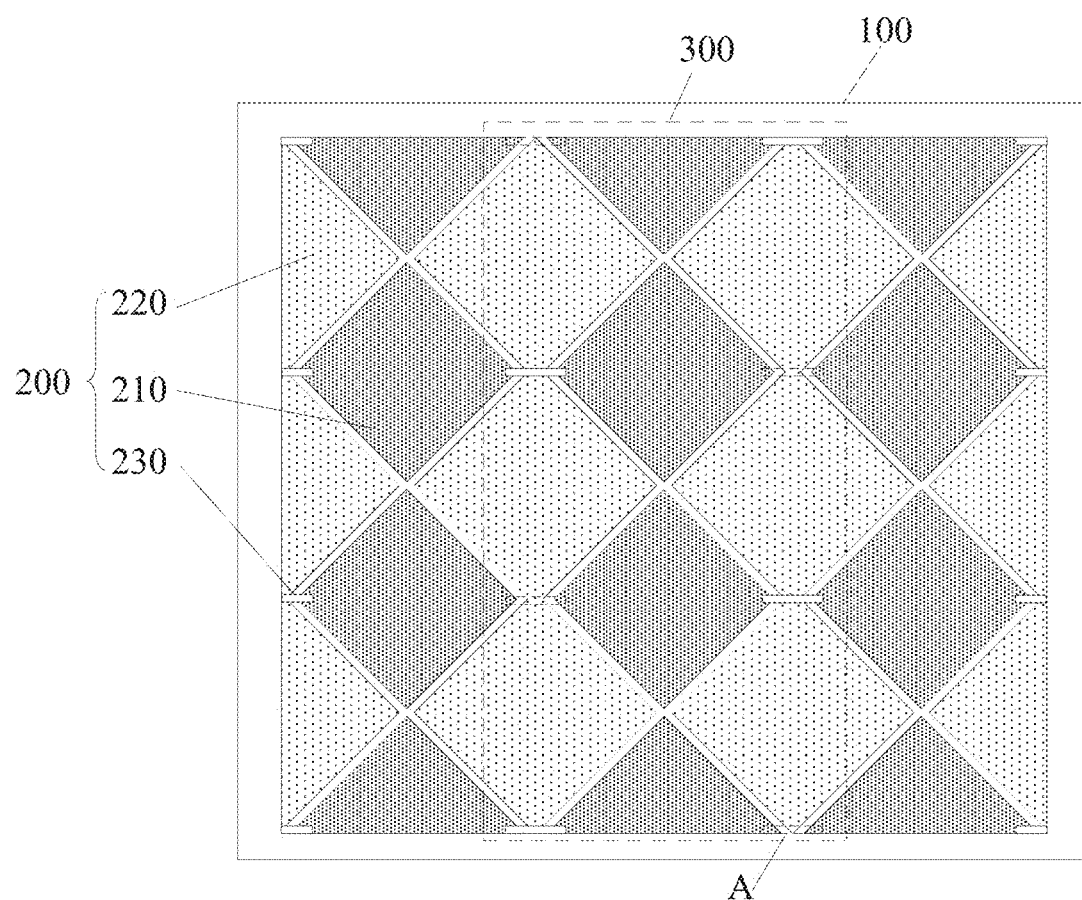
FIG. 20 illustrates a sixth structural schematic view of a flexible display panel according to some embodiments of the present disclosure.

In the flexible touch panel according to the present embodiment, as shown in FIG. 19 and FIG. 20, when the bendable area 300 includes the jumper line 230, at least part of the jumper line 230 included in the bendable area 300 may have the cutoff region A. As such, the impact exerted by the stress to the jumper line 230 may be reduced and the rupture of the jumper line 230 which may affect the touch operation performance can be prevented. Thus, each of more than one jumper lines may be a straight line having a cutoff part in the cutoff region. Sometimes, the more than one jumper lines may also be a bent line having a cutoff part in the cutoff region.

In one implementation, it is possible to perform the cutoff processing for all jumper lines 230, or a part of lines 230 included in the bendable area 300 or other variations which are not elaborated herein. For example, as shown in FIG. 19, each of jumper lines 230 that are located on the same straight line may be arranged to have the cutoff region A. Alternatively, as shown in FIG. 20, each of jumper lines 230 that extend in the bent line may be arranged to have the cutoff region A. In both FIG. 19 and FIG. 20, the cutoff region A is illustrated as jumper lines 230 that have dotted lines. The jumper lines 230 having dotted lines are to be moved. In practice, it is possible to remove merely part of jumper lines rather than the whole jumper lines in order to perform the cutoff processing.

It should be noted that in the flexible touch panel according to the embodiment of the present disclosure, the cutoff processing may be performed only for the touch driving electrodes 210 or for touch induction electrodes 220 included in the bendable area 300. Alternatively, the cutoff processing may be performed only for the jumper lines 230 included in the bendable area 300, or simultaneously for the electrode blocks of the touch driving (induction) electrodes 210 (220) and the jumper lines 230 included in the bendable area 300. Other variations may be available and the present disclosure does not elaborate.

Figure 21:
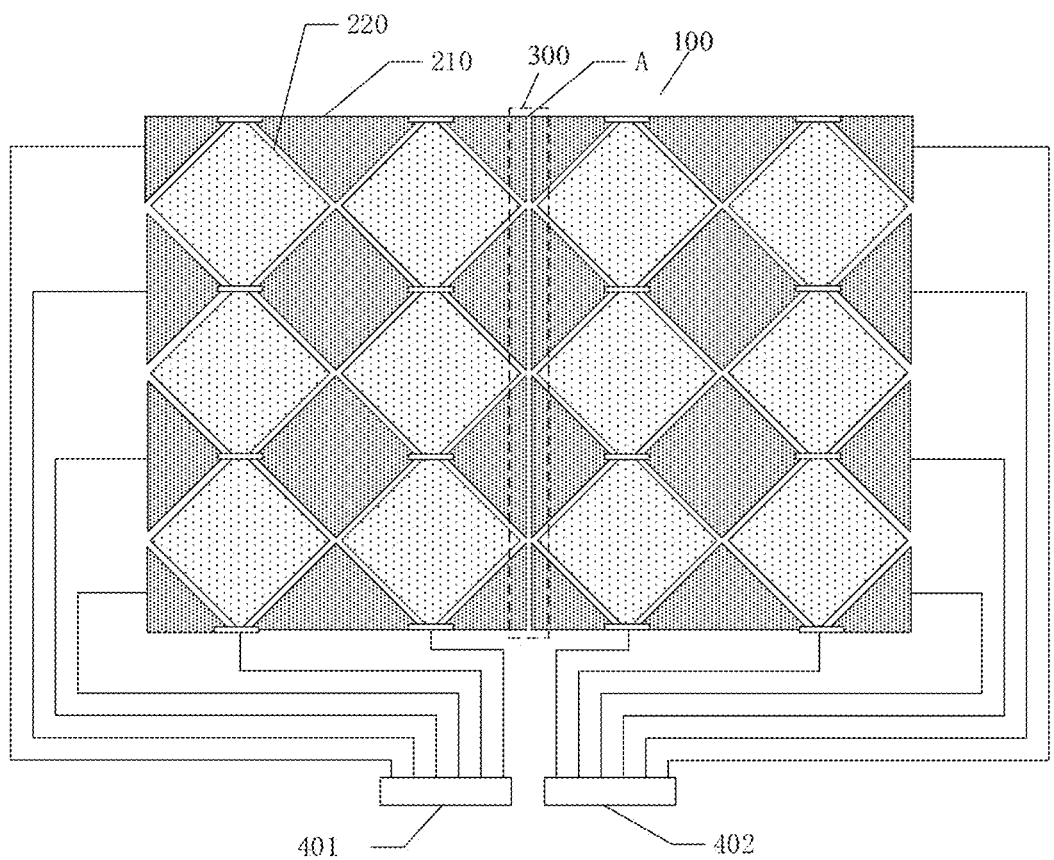
FIG. 21 illustrates a structural schematic view of a flexible display panel according to some embodiments of the present disclosure.

In some embodiments, the flexible touch panel includes an effective area provided with the touch electrodes and a periphery area surrounding the effective area. FIG. 21 illustrates a structural schematic view of a flexible display panel according to some embodiments of the present disclosure. For example, as illustrated in FIG. 21, the part of the first touch electrode 210 located at the left side of the cutoff region A is connected to a touch chip 410 through leads at the left side of the effective area, and the part of the first touch electrode 210 located at the right side of the cutoff region A is connected to a touch chip 420 through leads at the right side of the effective area. For the second touch electrodes 220, their extending direction is substantially parallel to the extending direction of the bendable area, and they can be divided as the second touch electrodes 220 at the left side of the cutoff region A and the second touch electrodes 220 at the right side of the cutoff region A. The second touch electrodes 220 at the left side of the cutoff region A can be connected to the touch chip 410, and the second touch electrodes 220 at the right side of the cutoff region A can be connected to the touch chip 420. Therefore, the touch electrode pattern can be divided into two parts at both sides of the cutoff region, which are controlled by two touch chip, respectively. For example, in the case that the flexible touch panel is applied in the bendable display screen, the touch region at one side of the bendable area may correspond to a non-display region when the bendable display screen is bent. In this case, this touch region can be controlled to cease to work so as to avoid the touch detection error caused by the touch floating phenomenon when the non-display region is touched. For example, in this embodiment, the touch electrode 210 extending horizontally is a touch induction electrode and the touch electrode 220 extending vertically is a touch driving electrode.

The above description takes the touch electrode pattern prepared from transparent conductive oxide such as ITO as an example, however, the embodiments of the present disclosure is not limited thereto, and the touch electrode pattern according to the embodiments of the present disclosure can also be a metal mesh electrode pattern or an electrode pattern of any other suitable material. For example, in the touch electrode pattern as illustrated in FIGS. 15 to 20, each square electrode block is replaced with a metal mesh block so as to form the metal mesh touch electrode pattern. For example, the electrode blocks of the first touch electrode and the electrode blocks of the second touch electrode can be metal mesh patterns. The metal mesh electrode blocks are connected by the first connecting portion and the second connecting portion. One of the first connecting portion and the second connecting portion is the jumper line, and the other may be a connecting line integrally formed with the metal mesh electrode blocks. Similarly, in the case of the metal mesh touch electrodes, the cutoff region can exist on the connecting portions or the electrode blocks, or on both the connecting portions and the electrode blocks.

Figure 22:
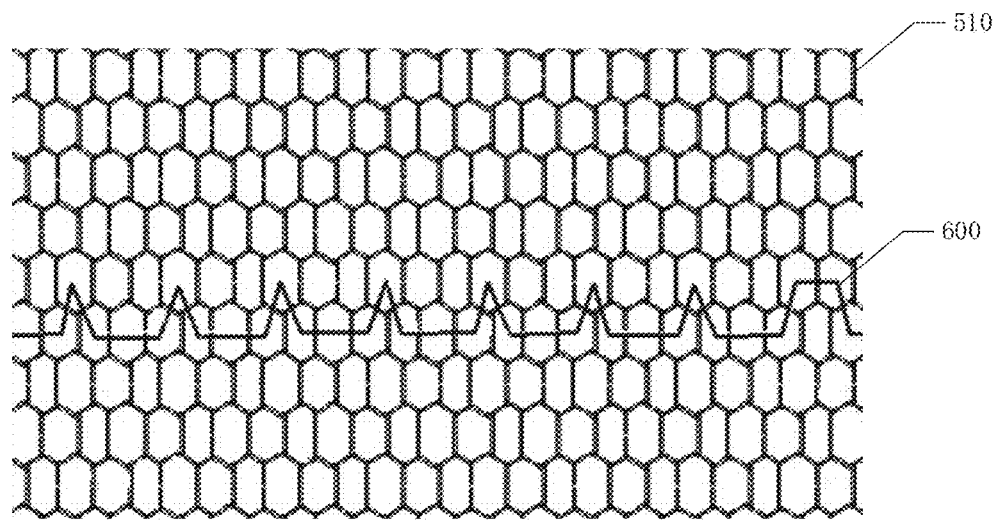
FIG. 22 illustrates a partial plan view of a metal mesh electrode block according to some embodiments of the disclosure.

In the case of the metal mesh electrode pattern, the cutoff region is realized by disconnecting the grid lines in a predetermined region. Each electrode block can include a plurality of grids, and the cutoff region can include a plurality of breakpoints in the grid lines defining the grids. As illustrated in FIG. 22, it illustrates a partial plan view of a metal mesh electrode block. The metal mesh electrode block includes a plurality of grids 510 connected to each other in a net or mesh shape. In the example illustrated in FIG. 22, each grid is approximately hexagonal in shape, however, the embodiments according to the present disclosure are not limited thereto, and the shape of the grids may be quadrangle or other polygon or irregular shape. The grid lines defining each grid are formed by metal lines, which may be silver nanowires or other suitable metal lines, for example. In order to realize the cutoff region of the metal mesh electrode block, fractures can be formed at the predetermined positions of some grid lines.

In the embodiments illustrated with reference to FIG. 16 and FIG. 17, the cutoff region of the electrode block may be in the form of a broken line. In the case of a metal mesh electrode pattern, for example, as illustrated in FIG. 22, along a broken line line 600 extending substantially in the horizontal direction in the figure, the grid lines are disconnected at the intersection positions of the broken line 600 and the grid lines defining the grids 510 to form the breakpoints. For example, in the case of such a cutoff region, the connecting line between the breakpoints is also a broken line, that is, it is not on the same straight line. For example, the broken line formed by the connecting line between breakpoints includes a plurality of straight line segments connected end to end, and the number of grids that each straight line segment passes through is not more than 5. That is to say, the breakpoints forming the cutoff region are not located on the same straight line. The maximum distance spanned by adjacent breakpoints on the same straight line does not exceed 5 grids. In this way, the visualization phenomenon of the cutoff region caused by the diffraction enhancement at the cutoff region can be weakened or avoided. For example, in each first touch electrode block, the breakpoints are not at the same straight line.

In addition, as described above, in order to avoid the visualization of the cutoff region, the cutoff region can be made as small as possible. In the case of the metal mesh electrode pattern, since its disconnection position is realized by each breakpoint on the grid line, the breaking distance (distance between opposite ends of disconnected grid line) of the breakpoint of the grid line can be very small, for example, it can be less than 10 µm. In some examples, the breaking distance may be less than or equal to 6 µm or 2 µm.

In some embodiments as mentioned above, the cutoff region is located around the bending axis and runs through the whole touch electrode pattern along the bending axis. However, the embodiments according to the present disclosure are not limited thereto, for example, the cutoff region can be provided at only partial positions in the direction along the bending axis; or, although the cutoff region is in the bendable area, it can deviate from the bending axis; alternatively, the cutoff region can be located at any other position within the bendable area. For example, the bending axis can be the center line of the strip-shaped bendable area.

The flexible touch structure described above can be a flexible touch panel alone or a flexible touch display panel bonded with a display structure, and the combination mode of the flexible touch structure and the display structure is not particularly limited. For example, it can be an out-cell touch display device in which a flexible touch panel is bonded with a display panel, or an on-cell or in-cell touch display device in which the touch structure is combined in the display panel. For example, in the case of an out-cell touch display device, the flexible touch panel and the display panel may be bonded with each other. In case of the on-cell and in-cell touch display device, the flexible substrate baseplate of the flexible touch panel can be one substrate in the display panel. For example, the above touch control structure can be integrated on the OLED display substrate, and it can be formed on the packaging layer of the OLED display substrate.

Based on the same disclosed concept, embodiments of the present disclosure may further provide a display device. The display device may include the flexible touch panel described above according to embodiments of the present disclosure. The display device may be any product or component having the display function such as a mobile phone, a tablet computer, a TV set, a display, a notebook computer, a digital photo frame or a navigator. The implementation of the display device may refer to the above embodiments of the flexible touch panel. Thus, the present disclosure does not described repeatedly herein.

The present disclosure provides a flexible touch panel. The flexible touch panel may include: a flexible substrate baseplate, and a touch electrode layer having a plurality of touch electrode patterns on the flexible substrate baseplate; where: the flexible touch panel has at least one bendable area, and at least one of the touch electrode patterns within the bendable area has a cutoff region to divide one electrode pattern into insulated portions.

In a possible implementation, each touch electrode pattern within the bendable area has the cutoff region to divide the electrode pattern into two substantially complementary portions.

In a possible implementation, each of the touch electrode patterns within the bendable area has the cutoff region to divide the one electrode pattern into the insulated portions.

In a possible implementation, connections of all cutoff regions within the bendable area bendable are substantially a straight line bendable area.

In a possible implementation, connections of all cutoff regions within the bendable area are substantially a bent line bendable area.

In a possible implementation, each touch electrode pattern within the bendable area has the cutoff region with central hollowed portions.

In a possible implementation, each touch electrode pattern within the bendable area comprises an outer contour.

In a possible implementation, a pattern line width of the outer contour of the touch electrode patterns within the bendable area is greater than 20 μm.

In a possible implementation, the flexible touch panel has one bendable area, the flexible touch panel is bendable along a first direction, and an extension direction of the bendable area is along a second direction that is substantially perpendicular to the first direction.

In a possible implementation, the cutoff region substantially extends along the extension direction of the bendable area.

In a possible implementation, all the touch electrode patterns within the bendable area have the cutoff region to divide one electrode pattern into two insulated portions, and the two insulated portions are distributed symmetrically in respect to the cutoff region.

In a possible implementation, the flexible touch panel further includes a plurality of jumper line with each electrically connecting adjacent touch electrode patterns.

In a possible implementation, the bendable are have at least one jumper line, and at least part of the at least one jumper line within the bendable area in the cutoff region of the bendable area.

In a possible implementation, each of more than one jumper lines is a straight line having a cutoff part in the cutoff region.

In a possible implementation, each of the more than one jumper lines is a bent line having a cutoff part in the cutoff region.

In a possible implementation, touch electrode patterns located on two sides of the cutoff region are connected by separated signal wirings and a single touch chip.

In a possible implementation, touch electrode patterns located on two sides of the cutoff region are connected by separated signal wirings and different touch chips.

In a possible implementation, one part of the touch electrode patterns comprises touch driving electrodes and another part of the touch electrode patterns comprises touch sense electrodes.

In another aspect, the present disclosure further provides a display apparatus.

In the flexible touch panel and display device according to the embodiments of the disclosure, the flexible touch electrode pattern may be liable to rupture at the bendable area at a fixed position when a transparent electrically conductive material with an undesirable flexibility is selected as the material for making the flexible touch electrode pattern for optical performance. Therefore, in the bendable area which is liable to rupture, at least part of the flexible touch electrode pattern may be directly arranged as a cutoff region. Thus, at least part of the flexible touch electrode pattern which should have been disposed in the bendable area is removed, thereby enabling these cutoff locations to release stress when the bendable area is bent. Also, damages caused by the stress generated by the bending to the flexible touch electrode pattern in the bendable area may be avoided. Such arrangement may not affect the touch operation performance.

At least one embodiment of the disclosure provides a flexible touch panel, comprising: a flexible substrate baseplate, and a touch electrode layer comprising a plurality of touch electrodes arranged on the flexible substrate baseplate, wherein the flexible touch panel includes at least one bendable area, and at least one of the plurality of touch electrodes has a cutoff region within the bendable area to disconnect the touch electrode.

In some examples, the touch electrodes comprise a plurality of first touch electrodes extending along a first direction and a plurality of second touch electrodes extending along a second direction, the bendable area comprises a bending axis, the first direction intersects with the bending axis, and at least one of the first touch electrodes is disconnected at the bendable area to be divided into different parts insulated from each other.

In some examples, each of the first touch electrodes comprises a plurality of first touch electrode blocks arranged along the first direction, and every two first touch electrode blocks adjacent along the first direction in the first touch electrodes are connected by a first connecting portion, each of the second touch electrodes comprises a plurality of second electrode blocks arranged along the second direction, and every two second touch electrode blocks adjacent along the second direction in the second touch electrodes are connected by a second connecting portion.

In some examples, the cutoff region of the first touch electrodes is located in the first touch electrode blocks of the first touch electrodes.

In some examples, the plurality of touch electrodes comprise at least one of a transparent metal oxide electrode pattern or a metal mesh pattern.

In some examples, at least one first touch electrode block of the first touch electrode located in the bendable area has the cutoff region.

In some examples, the first touch electrode blocks of the first touch electrodes and the second touch electrode blocks of the second touch electrode are metal mesh patterns, each first touch electrode block of the first touch electrode includes a plurality of grids, and the cutoff region includes breakpoints in grid lines defining the grids.

In some examples, a connecting line of the breakpoints of the grid lines of the first touch electrode blocks within the bendable area are not on the same straight line.

In some examples, the connecting line of the breakpoints of the grid lines of the electrode blocks within the bendable area is of a broken line shape formed by connecting a plurality of straight line segments, wherein the number of grids that each straight line segment passes through does not exceed five.

In some examples, a breaking distance of each of the breakpoints in the grid lines is less than 10 μm.

In some examples, the bending axis extends along the second direction, and the first direction is substantially perpendicular to the second direction.

In some examples, the flexible touch panel comprises an effective area and a peripheral area surrounding the effective area, and ends of each of the first touch electrodes located on both sides of the bending axis are respectively connected with leads located in the peripheral areas on both sides of the effective area in the first direction, so as to respectively apply signals to parts of the first touch electrode located on both sides of the bending axis.

In some examples, the parts of the first touch electrodes and the second touch electrodes located on one side of the bending axis of the flexible panel are connected to a first touch driver, and the parts of the first touch electrodes and the second touch electrodes located on the other side of the bending axis of the flexible panel are connected to a second touch driver.

In some examples, the cutoff region is located in at least one of the first touch electrode blocks of the first touch electrodes located in the bendable area, and the cutoff region extends along a broken line in a direction parallel to the substrate baseplate.

In some examples, a width of the cutoff region in a direction perpendicular to the extending direction of the cutoff region is less than 10 μm.

In some examples, at least one electrode block of the first touch electrodes or the second touch electrodes in the bendable area has a central hollowed portion, and a pattern line width of the electrode block with the central hollowed portion is greater than 20 μm.

In some examples, the first connecting portions of the first touch electrodes located in the bendable area have the cutoff region.

In some examples, a connecting line of the cutoff regions of the first connecting portions of the first touch electrodes is of a broken line shape.

In some examples, each of the first connecting portions is a jumper line.

Figure 23A:
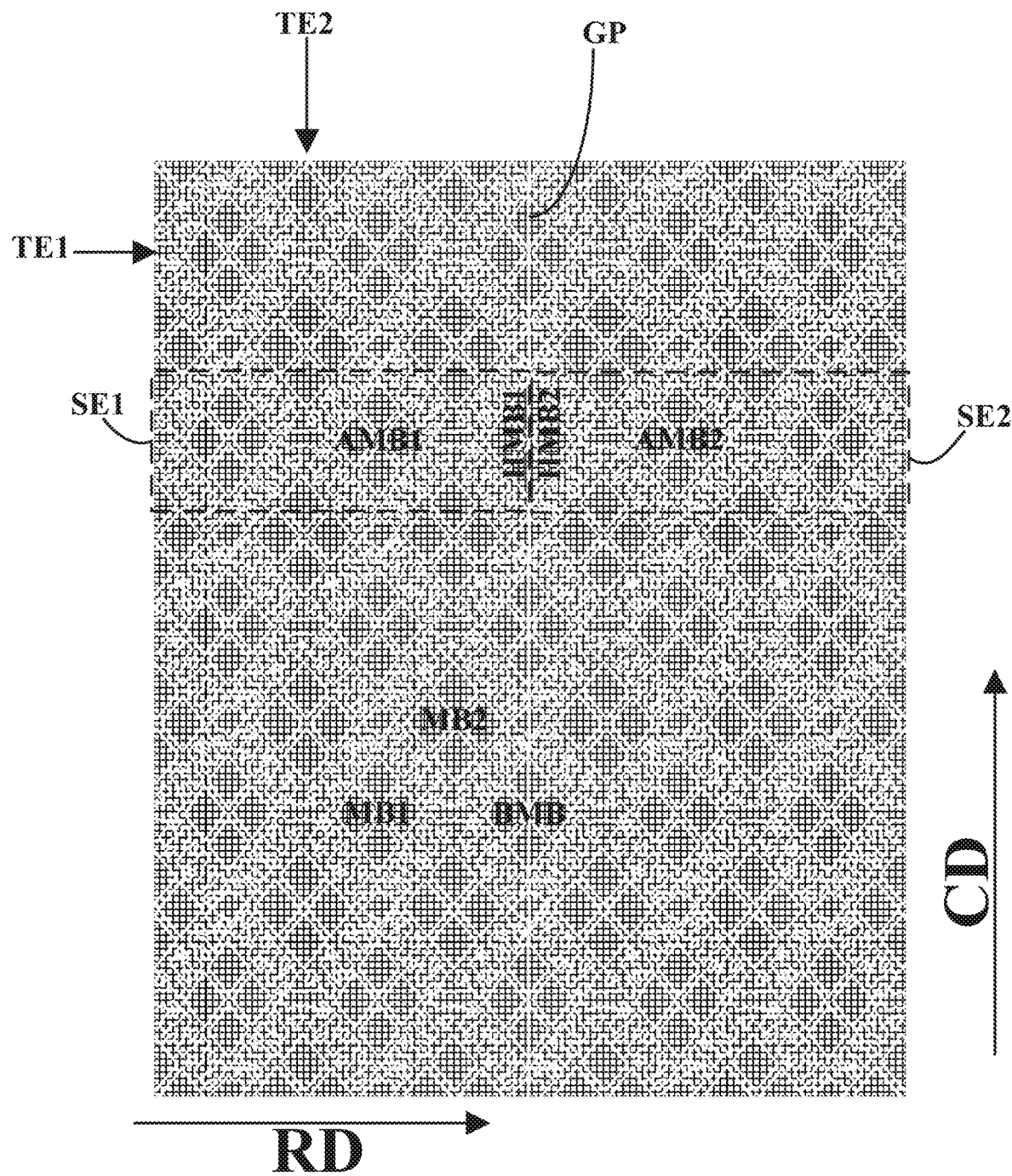
FIG. 23A is a schematic diagram illustrating the structure of a touch control structure in some embodiments according to the present disclosure.

FIG. 23A is a schematic diagram illustrating the structure of a touch control structure in some embodiments according to the present disclosure. Referring to FIG. 23A, the touch control structure in some embodiments includes a plurality of first mesh electrodes TE1 arranged in a plurality of rows and a plurality of second mesh electrodes TE2 arranged in a plurality of columns. Adjacent rows of the plurality of rows are isolated from each other. Adjacent columns of the plurality of columns are isolated from each other.

In some embodiments, the plurality of first mesh electrodes TE1 include a plurality of first sub-electrodes SE1 and a plurality of second sub-electrodes SE2. A respective one of the plurality of first mesh electrodes includes a respective one of the plurality of first sub-electrodes SE1 and a respective one of the plurality of second sub-electrodes SE2. A respective column of the plurality of columns includes a plurality of second mesh blocks MB2 electrically connected together and arranged along a column direction CD. A respective row of the plurality of rows includes a plurality of first mesh blocks MB1 arranged along a row direction RD.

As shown in FIG. 23A, a respective one of the plurality of first mesh blocks MB1 includes a plurality of fill patterns; and a respective one of the plurality of second mesh blocks MB2 includes a plurality of fill patterns.

In some embodiments, the plurality of first mesh blocks MB1 in the respective row include a respective bendable mesh block BMB. In some embodiments, the respective bendable mesh block BMB includes a respective first half mesh block HMB1 and a respective second half mesh block HMB2 directly adjacent to each other and spaced apart by a respective gap GP. Optionally, the plurality of first mesh blocks MB1 in the respective row further includes multiple first adjacent mesh blocks AMB1 and multiple second adjacent mesh blocks AMB2 in a same row. Optionally, the multiple first adjacent mesh blocks AMB1 and the respective first half mesh block HMB1 are electrically connected to each other, forming the respective one of the plurality of first sub-electrodes SE1. Optionally, the multiple second adjacent mesh blocks AMB2 and the respective second half mesh block HMB2 are electrically connected, forming the respective one of the plurality of second sub-electrodes SE2 that is spaced apart from the respective one of the plurality of first sub-electrodes SE1 by the respective gap GP.

Optionally, a combination of the respective first half mesh block HMB1, the respective gap GP, and the respective second half mesh block HMB2, has a shape substantially same as a shape of an immediate adjacent first adjacent mesh block of the multiple first adjacent mesh blocks AMB1, the immediate adjacent first adjacent mesh block directly connected to the respective first half mesh block HMB1. Optionally, the combination of the respective first half mesh block HMB1, the respective gap GP, and the respective second half mesh block HMB2, has a shape substantially same as a shape of an immediate adjacent second adjacent mesh block of the multiple second adjacent mesh blocks AMB2, the immediate adjacent second adjacent mesh block directly connected to the respective second half mesh block HMB2.

Figure 23B:
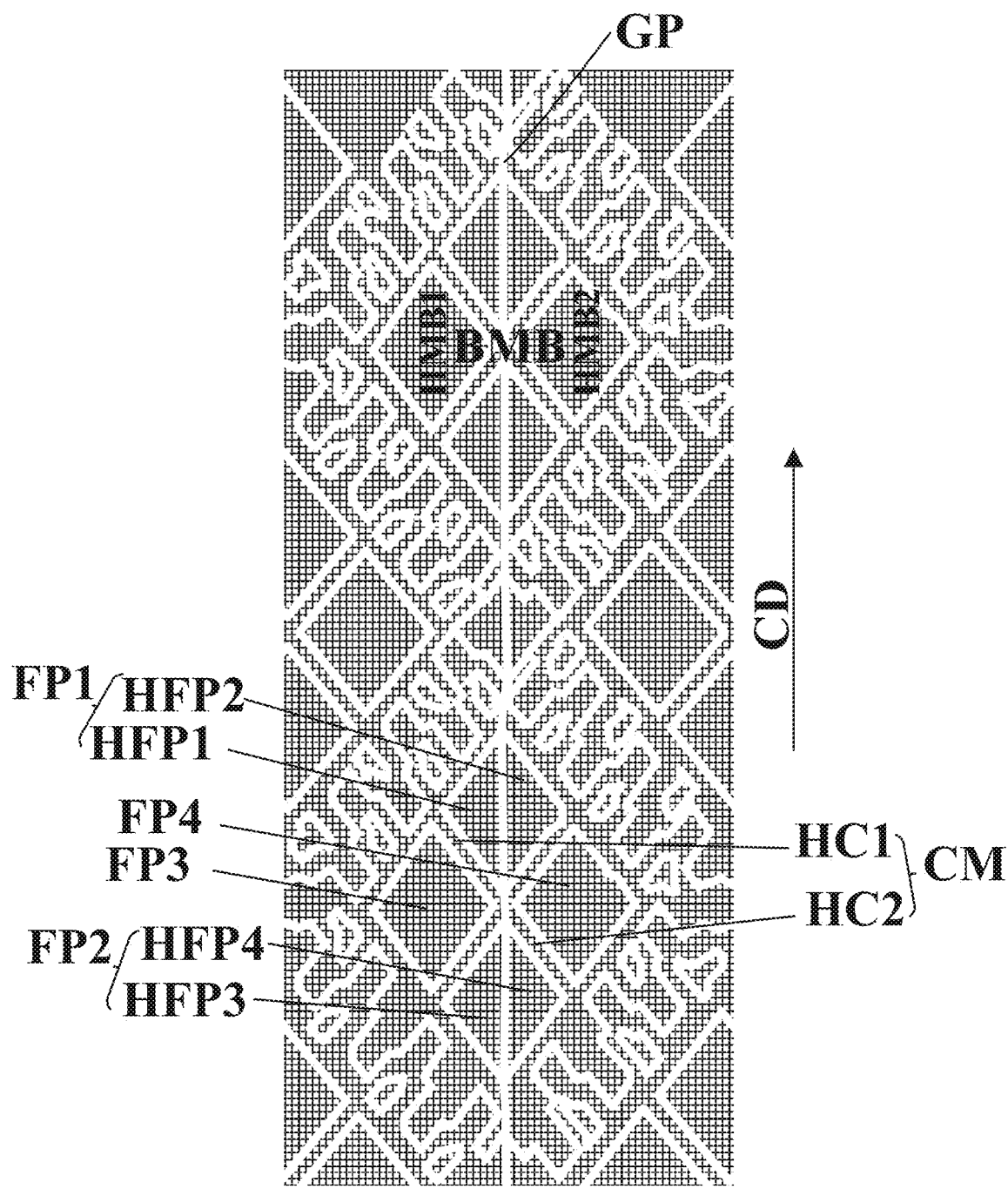
FIG. 23B is a schematic diagram illustrating the structure of a plurality of gaps respectively in a plurality of bendable mesh blocks along the column direction in some embodiments according to the present disclosure.

FIG. 23B is a partial zoom-in view of the touch control structure in FIG. 23A. Referring to FIG. 23B, the respective bendable mesh block comprises a plurality of fill patterns. In some embodiments, the respective gap GP of the plurality of gaps spaces apart a first fill pattern FP1 in the plurality of fill patterns into a first half fill pattern HFP1 and a second half fill pattern HFP2, spaces apart a second fill pattern FP2 in the plurality of fill patterns into a third half fill pattern HFP3 and a fourth half fill pattern HFP4. Optionally, the respective first half mesh block HMB1 further includes a third fill pattern FP3. Optionally, the respective second half mesh block HMB2 further includes a fourth fill pattern FP4. Optionally, the respective gap GP of the plurality of gaps spaces apart the third fill pattern FP3 from the fourth fill pattern FP4. Optionally, the respective gap GP of the plurality of gaps further spaces apart a cross mesh structure CM of the respective bendable mesh block BMB into a first half cross mesh structure HC1 (part of the respective first half mesh block HMB1) and a second half cross mesh structure HC2 (part of the respective second half mesh block HMB2). The first half cross mesh structure HC1 is part of a conductive path in the respective one of the plurality of first sub-electrodes SE1. The second half cross mesh structure HC2 is part of a conductive path in the respective one of the plurality of second sub-electrodes SE2.

As shown in FIG. 23B, the first half cross mesh structure HC1 spaces apart the third fill pattern FP3 from the first half fill pattern HFP1, and spaces apart the third fill pattern FP3 from the third half fill pattern HFP3. The second half cross mesh structure HC2 spaces apart the fourth fill pattern FP4 from the second half fill pattern HFP2, and spaces apart the fourth fill pattern FP4 from the fourth half fill pattern HFP4.

Figure 24A:
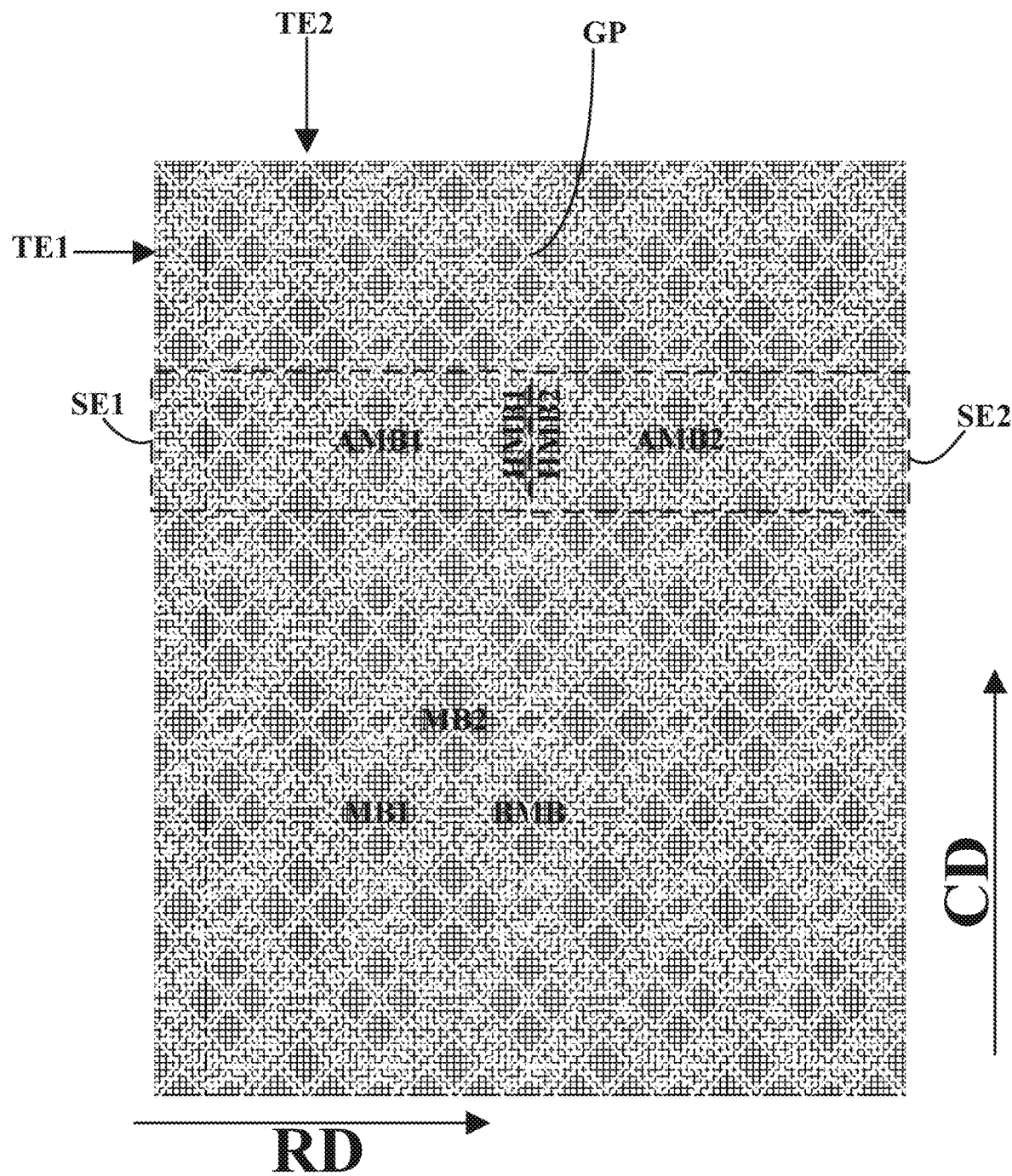
FIG. 24A is a schematic diagram illustrating the structure of a touch control structure in some embodiments according to the present disclosure.

FIG. 24A is a schematic diagram illustrating the structure of a touch control structure in some embodiments according to the present disclosure. Referring to FIG. 24A, the touch control structure in some embodiments includes a plurality of first mesh electrodes TE1 arranged in a plurality of rows and a plurality of second mesh electrodes TE2 arranged in a plurality of columns. Adjacent rows of the plurality of rows are isolated from each other. Adjacent columns of the plurality of columns are isolated from each other.

In some embodiments, the plurality of first mesh electrodes TE1 include a plurality of first sub-electrodes SE1 and a plurality of second sub-electrodes SE2. A respective one of the plurality of first mesh electrodes includes a respective one of the plurality of first sub-electrodes SE1 and a respective one of the plurality of second sub-electrodes SE2. A respective column of the plurality of columns includes a plurality of second mesh blocks MB2 electrically connected together and arranged along a column direction CD. A respective row of the plurality of rows includes a plurality of first mesh blocks MB1 arranged along a row direction RD. As shown in FIG. 24A, a respective one of the plurality of first mesh blocks MB1 includes a plurality of fill patterns; and a respective one of the plurality of second mesh blocks MB2 includes a plurality of fill patterns.

Figure 24B:
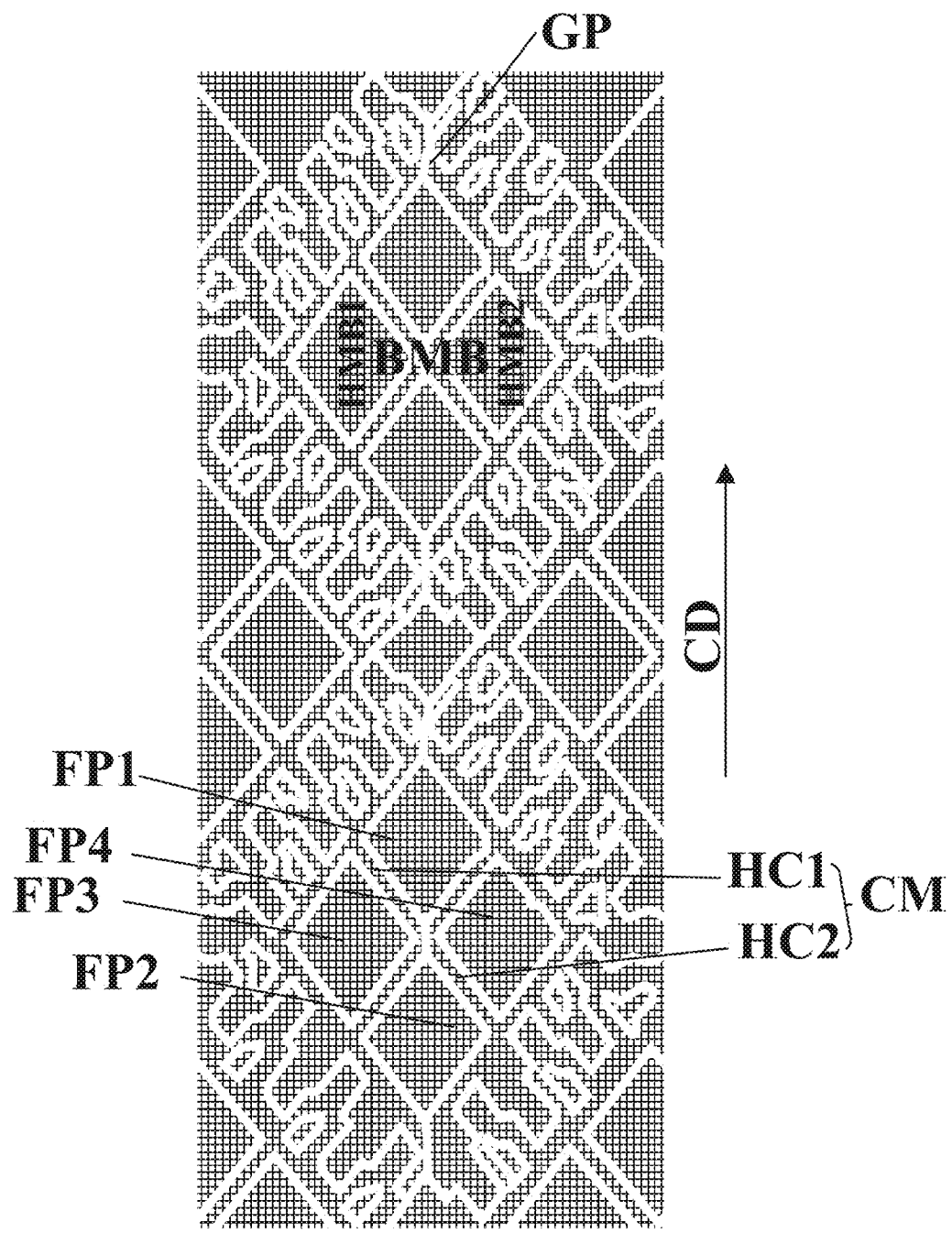
FIG. 24B is a schematic diagram illustrating the structure of a plurality of gaps respectively in a plurality of bendable mesh blocks along the column direction in some embodiments according to the present disclosure.

FIG. 24B is a partial zoom-in view of the touch control structure in FIG. 24A. Referring to FIG. 24B, in some embodiments, the respective gap GP of the plurality of gaps spaces apart a cross mesh structure CM of the respective bendable mesh block BMB into a first half cross mesh structure HC1 (part of the respective first half mesh block HMB1) and a second half cross mesh structure HC2 (part of the respective second half mesh block HMB2). The first half cross mesh structure HC1 is part of a conductive path in the respective one of the plurality of first sub-electrodes SE1. The second half cross mesh structure HC2 is part of a conductive path in the respective one of the plurality of second sub-electrodes SE2. As compared to the touch control structure in FIG. 23A and FIG. 23B, the first fill pattern FP1 remains intact, and are not spaced apart by the respective gap GP into separate half fill patterns; the second fill pattern FP2 remains intact, and are not spaced apart by the respective gap GP into separate half fill patterns.

As shown in FIG. 24B, the first half cross mesh structure HC1 spaces apart the third fill pattern FP3 from the first fill pattern FP1, and spaces apart the third fill pattern FP3 from the second fill pattern FP2. The second half cross mesh structure HC2 spaces apart the fourth fill pattern FP4 from the first fill pattern FP1, and spaces apart the fourth fill pattern FP4 from the second fill pattern FP2.

Figure 25:
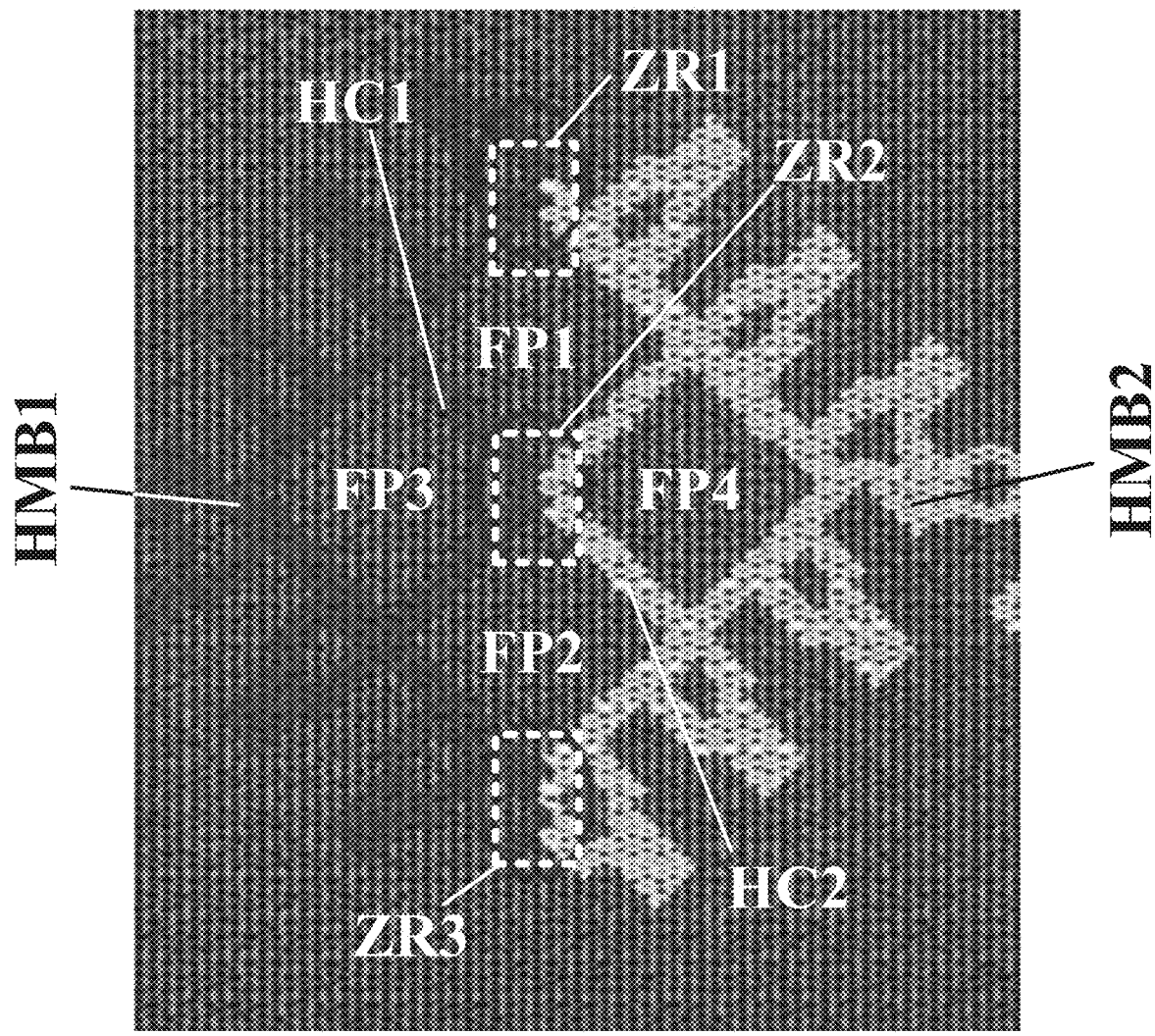
FIG. 25 illustrates the structure of a respective bendable mesh block in some embodiments according to the present disclosure.
Figure 26:
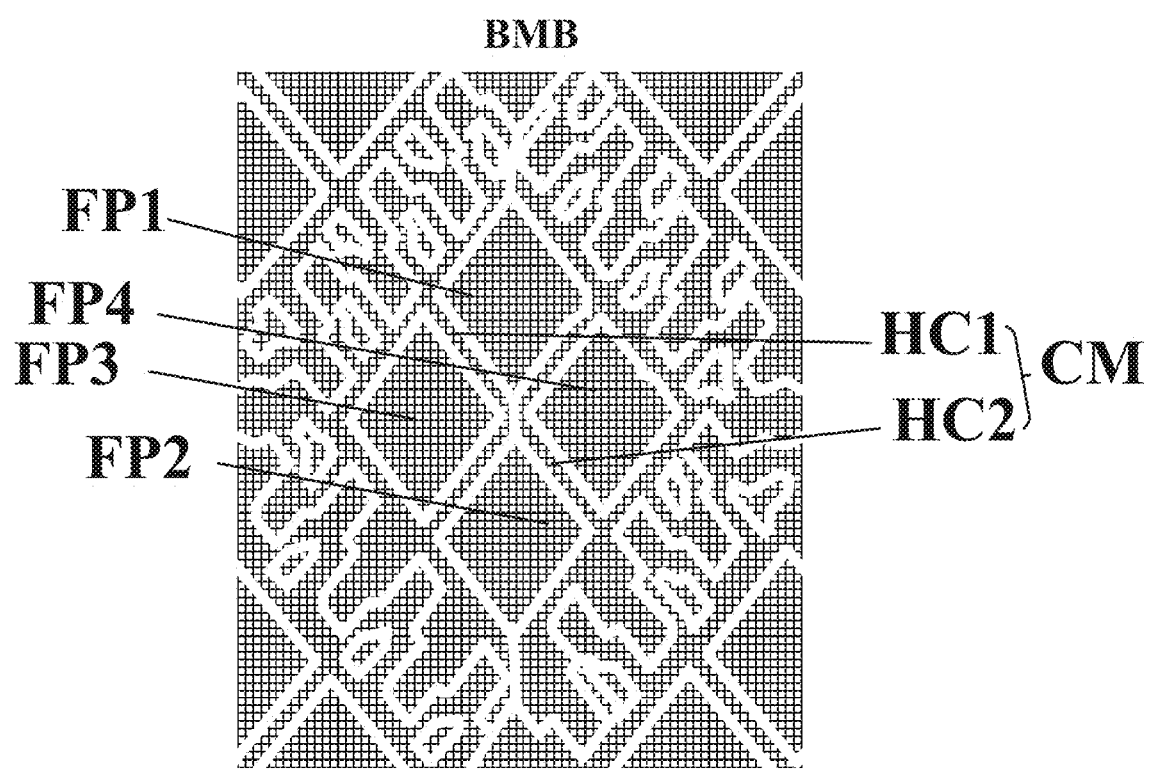
FIG. 26 is a schematic diagram illustrating the structure of a respective bendable mesh block in some embodiments according to the present disclosure.
Figure 27:
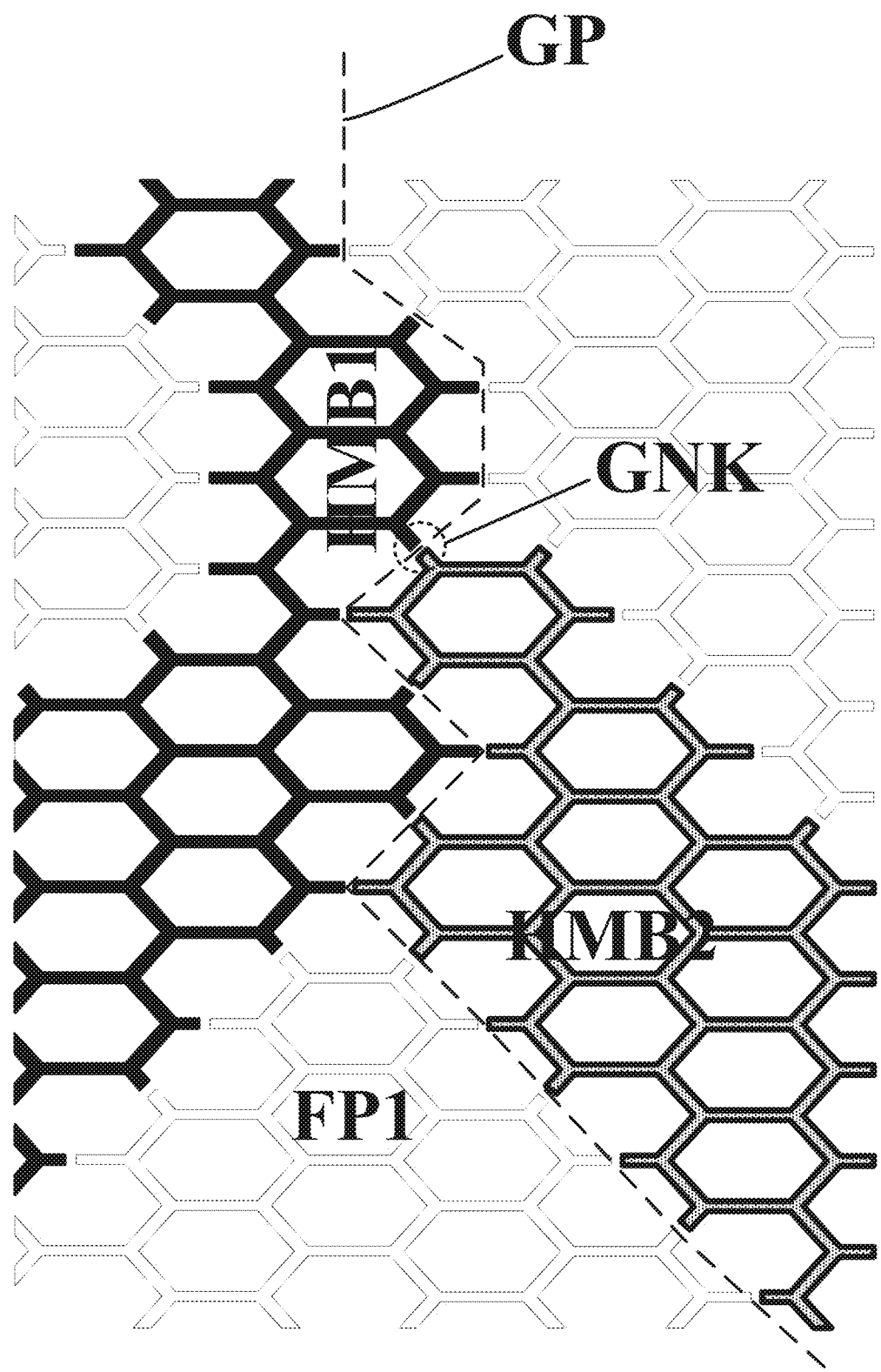
FIG. 27 is a zoom-in view of a first zoom-in region ZR1 in FIG. 25.
Figure 28:
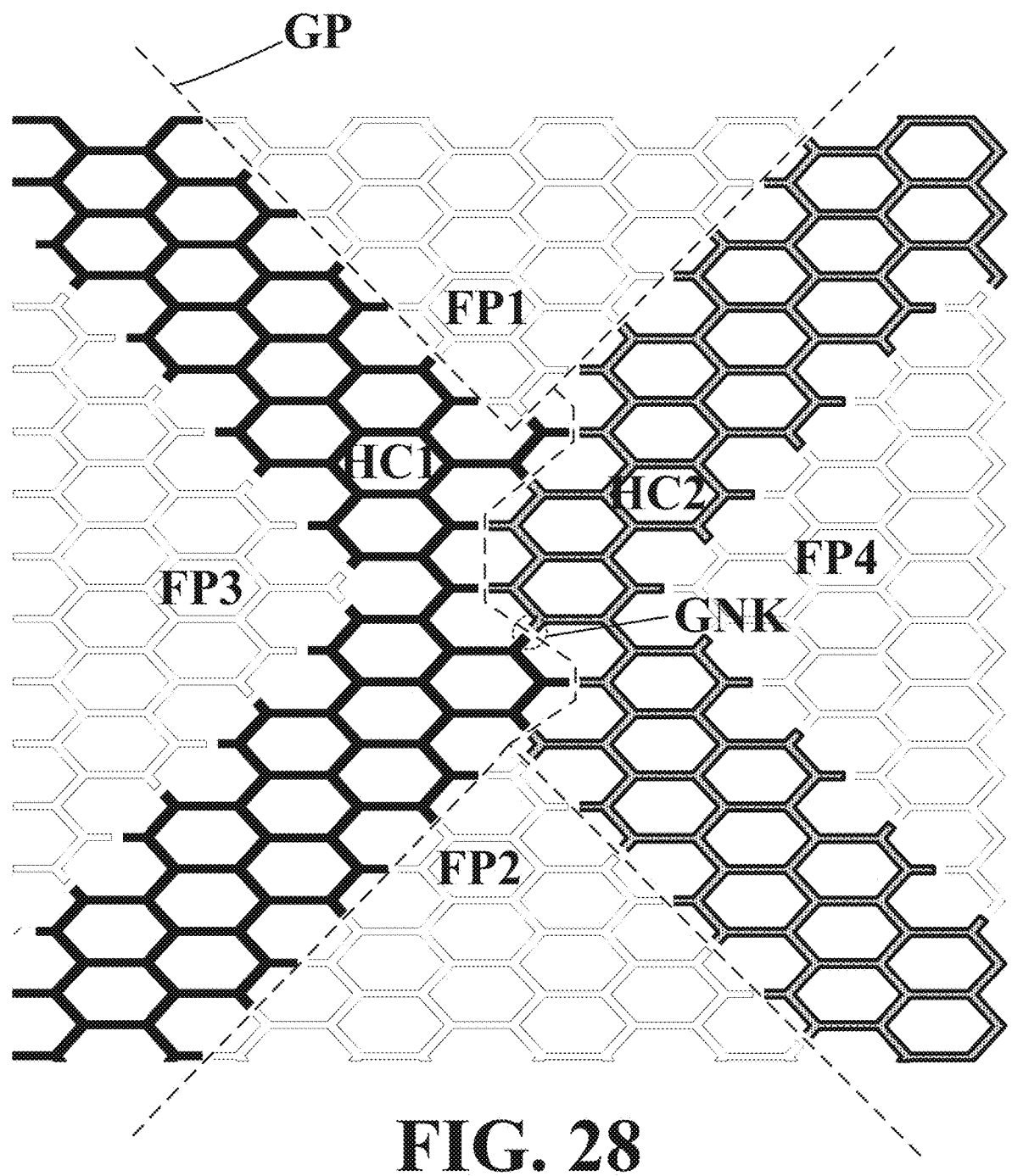
FIG. 28 is a zoom-in view of a second zoom-in region ZR2 in FIG. 25.
Figure 29:
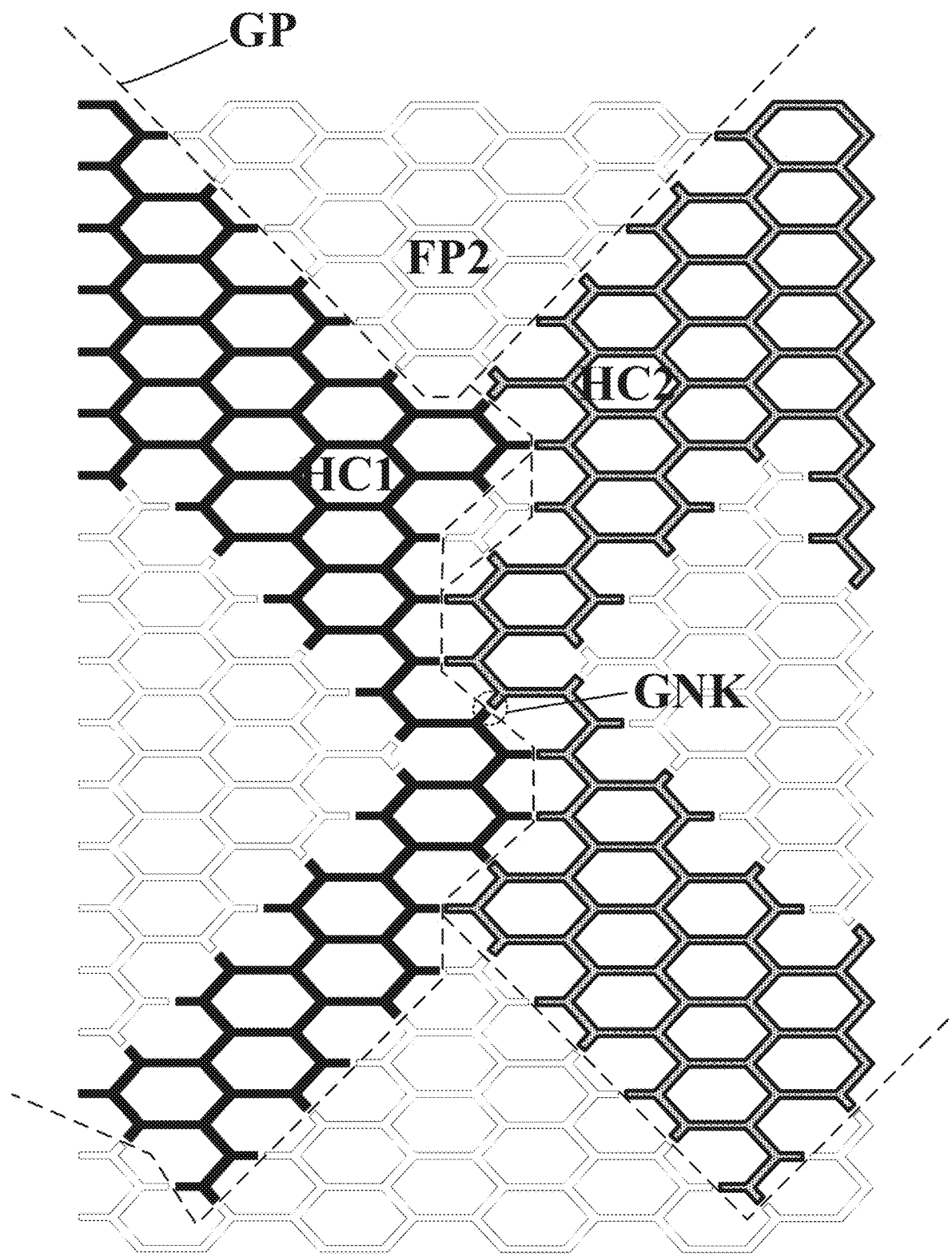
FIG. 29 is a zoom-in view of a third zoom-in region ZR3 in FIG. 25.

FIG. 25 illustrates the structure of a respective bendable mesh block in some embodiments according to the present disclosure. FIG. 26 is a schematic diagram illustrating the structure of a respective bendable mesh block in some embodiments according to the present disclosure. FIG. 27 is a zoom-in view of a first zoom-in region ZR1 in FIG. 25. FIG. 28 is a zoom-in view of a second zoom-in region ZR2 in FIG. 25. FIG. 29 is a zoom-in view of a third zoom-in region ZR3 in FIG. 25. Referring to FIG. 25 to FIG. 29, in a respective bendable mesh block BMB of the plurality of bendable mesh blocks,, a respective gap GP of the plurality of gaps includes a plurality of line opens GNK respectively breaking open multiple mesh lines of the respective bendable mesh block BMB. The respective gap GP spaces apart the respective bendable mesh block BMB into a respective first half mesh block HMB1 and a respective second half mesh block HMB2 directly adjacent to each other. The respective first half mesh block HMB1 and the respective second half mesh block HMB2 are insulated from each other by the respective gap GP. In one example, the respective first half mesh block HMB1 and the respective second half mesh block HMB2 are insulated from each other due to at least the presence of a combination of the plurality of line opens GNK. In another example, the respective gap GP includes the plurality of line opens GNK, line opens between the respective first half mesh block HMB1 and an adjacent fill pattern, and line opens between the respective second half mesh block HMB2 and an adjacent fill pattern.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control structure, comprising a plurality of first mesh electrodes arranged in a plurality of rows and a plurality of second mesh electrodes arranged in a plurality of columns;

wherein the touch control structure comprises a plurality of bendable mesh blocks along a column direction, and a plurality of gaps respectively in the plurality of bendable mesh blocks;

in a respective bendable mesh block of the plurality of bendable mesh blocks, a respective gap of the plurality of gaps comprises a plurality of line opens respectively breaking open multiple mesh lines of the respective bendable mesh block;

the respective gap spaces apart the respective bendable mesh block into a respective first half mesh block and a respective second half mesh block directly adjacent to each other, the first half mesh block and a respective second half mesh block insulated from each other by the respective gap;

at least two adjacent line opens of the plurality of line opens in the respective gap are arranged in a direction non-parallel to the column direction; and the touch control structure is bendable along the plurality of gaps.

2. The touch control structure of claim 1, wherein a respective row of the plurality of rows comprises a plurality of first mesh blocks arranged along a row direction;

the plurality of first mesh blocks in the respective row comprise the respective first half mesh block and the respective second half mesh block of the respective bendable mesh block, multiple first adjacent mesh blocks, and multiple second adjacent mesh blocks in a same row; and the multiple first adjacent mesh blocks are on a side of the respective bendable mesh block away from the multiple second adjacent mesh blocks.

3. The touch control structure of claim 2, wherein a combination of the respective first half mesh block, the respective gap, and the respective second half mesh block, has a shape substantially same as a shape of an immediate adjacent first adjacent mesh block of the multiple first adjacent mesh blocks, the immediate adjacent first adjacent mesh block being most adjacent to the respective first half mesh block among the multiple first adjacent mesh blocks.

4. The touch control structure of claim 2, wherein the combination of the respective first half mesh block, the respective gap, and the respective second half mesh block, has a shape substantially same as a shape of an immediate adjacent second adjacent mesh block of the multiple second adjacent mesh blocks, the immediate adjacent second adjacent mesh block being most adjacent to the respective second half mesh block among the multiple second adjacent mesh blocks.

5. The touch control structure of claim 1, wherein the plurality of first mesh electrodes comprise a plurality of first sub-electrodes and a plurality of second sub-electrodes;

a respective one of the plurality of first mesh electrodes comprises a respective one of the plurality of first sub-electrodes and a respective one of the plurality of second sub- electrodes;

a respective column of the plurality of columns comprises a plurality of second mesh blocks electrically connected together and arranged along a column direction;

a respective row of the plurality of rows comprises a plurality of first mesh blocks arranged along a row direction;

the plurality of first mesh blocks in the respective row comprise the respective first half mesh block and the respective second half mesh block of the respective bendable mesh block, multiple first adjacent mesh blocks, and multiple second adjacent mesh blocks in a same row;

the multiple first adjacent mesh blocks and the respective first half mesh block are electrically connected to each other, forming the respective one of the plurality of first sub-electrodes; and the multiple second adjacent mesh blocks and the respective second half mesh block are electrically connected, forming the respective one of the plurality of second sub-electrodes that is spaced apart from the respective one of the plurality of first sub-electrodes by the respective gap.

6. The touch control structure of claim 5, further comprising:

a plurality of first touch signal lines respectively connected to the plurality of first sub-electrodes;

a plurality of second touch signal lines respectively connected to the plurality of second sub-electrodes; and a plurality of third touch signal lines respectively connected to the plurality of second mesh electrodes;

wherein, in a same respective row, a respective one of the plurality of first touch signal lines is electrically connected to the multiple first adjacent mesh blocks and the respective first half mesh block in the respective one of the plurality of first sub-electrodes, and a respective one of the plurality of second touch signal lines is electrically connected to the multiple second adjacent mesh blocks and the respective second half mesh block in the respective one of the plurality of second sub-electrodes.

7. The touch control structure of claim 6, wherein the plurality of first touch signal lines and the plurality of second touch signal lines are touch sensing signal lines;

the plurality of first touch signal lines and the plurality of second touch signal lines are two independent sets of touch signals lines that are independently controlled; and the plurality of third touch signal lines are touch scanning signal lines configured to provide touch scanning signals respectively to the plurality of second mesh blocks respectively in the plurality of columns.

8. The touch control structure of claim 5, wherein the plurality of bendable mesh blocks are spaced apart from each other along the column direction.

9. The touch control structure of claim 8, wherein first mesh blocks of the plurality of rows of the plurality of first mesh electrodes and second mesh blocks of the plurality of columns of the plurality of second mesh electrodes are respectively arranged in interlaced matrices, forming a plurality of bridge intersections and a plurality of non-bridge intersections;

in a respective one of the plurality of non-bridge intersections, adjacent mesh blocks are spaced apart and insulated from each other;

adjacent bendable mesh blocks of the plurality of bendable mesh blocks are spaced apart from each other along the column direction by the respective one of the plurality of non-bridge intersections; and the plurality of gaps and multiple non-bridge intersections respectively spacing apart the plurality of bendable mesh blocks along the column direction together form the bendable line along which the touch control structure is bendable.

10. The touch control structure of claim 1, wherein a contour line of the respective gap is an undulating contour line.

11. The touch control structure of claim 10, wherein the undulating contour line comprises alternating half waves and base lines.

12. The touch control structure of claim 11, wherein at least two of the half waves have different wave forms.

13. The touch control structure of claim 12, wherein the different wave forms comprise a triangular half wave form and a trapezoidal half wave form; and the base lines are aligned along a direction substantially parallel to the column direction.

14. The touch control structure of claim 1, wherein the respective bendable mesh block comprises a plurality of fill patterns;

the respective gap of the plurality of gaps spaces apart a first fill pattern in the plurality of fill patterns into a first half fill pattern and a second half fill pattern, spaces apart a second fill pattern in the plurality of fill patterns into a third half fill pattern and a fourth half fill pattern;

the respective first half mesh block further comprises a third fill pattern;

the respective second half mesh block further comprises a fourth fill pattern;

the respective gap of the plurality of gaps spaces apart the third fill pattern from the fourth fill pattern; and the respective gap of the plurality of gaps further spaces apart a cross mesh structure of the respective bendable mesh block into a first half cross mesh structure and a second half cross mesh structure.

15. The touch control structure of claim 5, wherein the respective bendable mesh block comprises a plurality of fill patterns;

the respective gap of the plurality of gaps spaces apart a first fill pattern in the plurality of fill patterns into a first half fill pattern and a second half fill pattern, spaces apart a second fill pattern in the plurality of fill patterns into a third half fill pattern and a fourth half fill pattern;

the respective first half mesh block further comprises a third fill pattern;

the respective second half mesh block further comprises a fourth fill pattern;

the respective gap of the plurality of gaps spaces apart the third fill pattern from the fourth fill pattern;

the respective gap of the plurality of gaps further spaces apart a cross mesh structure of the respective bendable mesh block into a first half cross mesh structure and a second half cross mesh structure;

the first half cross mesh structure is part of a conductive path in the respective one of the plurality of first sub-electrodes; and the second half cross mesh structure is part of a conductive path in the respective one of the plurality of second sub-electrodes.

16. A display apparatus, comprising a display panel, a touch control structure on the display panel, and a plurality of touch control integrated circuits connect to the touch control structure;

wherein the touch control structure comprises a plurality of first mesh electrodes arranged in a plurality of rows and a plurality of second mesh electrodes arranged in a plurality of columns;

wherein the touch control structure comprises a plurality of bendable mesh blocks along a column direction, and a plurality of gaps respectively in the plurality of bendable mesh blocks;

in a respective bendable mesh block of the plurality of bendable mesh blocks, a respective gap of the plurality of gaps comprises a plurality of line opens respectively breaking open multiple mesh lines of the respective bendable mesh block;

the respective gap spaces apart the respective bendable mesh block into a respective first half mesh block and a respective second half mesh block directly adjacent to each other, the first half mesh block and a respective second half mesh block insulated from each other by the respective gap;

at least two adjacent line opens of the plurality of line opens in the respective gap are arranged in a direction non-parallel to the column direction; and the touch control structure is bendable along the plurality of gaps.

17. The display apparatus of claim 16, wherein a respective row of the plurality of rows comprises a plurality of first mesh blocks arranged along a row direction;

the plurality of first mesh blocks in the respective row comprise the respective first half mesh block and the respective second half mesh block of the respective bendable mesh block, multiple first adjacent mesh blocks, and multiple second adjacent mesh blocks in a same row; and the multiple first adjacent mesh blocks are on a side of the respective second half mesh block away from the multiple second adjacent mesh blocks.

18. The display apparatus of claim 17, wherein a combination of the respective first half mesh block, the respective gap, and the respective second half mesh block, has a shape substantially same as a shape of an immediate adjacent first adjacent mesh block of the multiple first adjacent mesh blocks, the immediate adjacent first adjacent mesh block being most adjacent to the respective first half mesh block among the multiple first adjacent mesh blocks.

19. The display apparatus of claim 17, wherein the combination of the respective first half mesh block, the respective gap, and the respective second half mesh block, has a shape substantially same as a shape of an immediate adjacent second adjacent mesh block of the multiple second adjacent mesh blocks, the immediate adjacent second adjacent mesh block being most adjacent to the respective second half mesh block among the multiple second adjacent mesh blocks.

20. The display apparatus of claim 16, wherein the plurality of first mesh electrodes comprise a plurality of first sub-electrodes and a plurality of second sub-electrodes;

a respective one of the plurality of first mesh electrodes comprises a respective one of the plurality of first sub-electrodes and a respective one of the plurality of second sub-electrodes;

a respective column of the plurality of columns comprises a plurality of second mesh blocks electrically connected together and arranged along a column direction;

a respective row of the plurality of rows comprises a plurality of first mesh blocks arranged along a row direction;

the plurality of first mesh blocks in the respective row comprise the respective first half mesh block and the respective second half mesh block of the respective bendable mesh block, multiple first adjacent mesh blocks, and multiple second adjacent mesh blocks in a same row;

the multiple first adjacent mesh blocks and the respective first half mesh block are electrically connected to each other, forming the respective one of the plurality of first sub-electrodes; and the multiple second adjacent mesh blocks and the respective second half mesh block are electrically connected, forming the respective one of the plurality of second sub-electrodes that is spaced apart from the respective one of the plurality of first sub-electrodes by the respective gap.

* * * * *